(12) United States Patent
Moshinsky

(10) Patent No.: US 6,288,208 B1
(45) Date of Patent: Sep. 11, 2001

(54) HIGHLY BRANCHED OLIGOMERS, PROCESS FOR THEIR PREPARATION AND APPLICATIONS THEREOF

(75) Inventor: Leonid Moshinsky, Yavne (IL)

(73) Assignee: Epox, Ltd., Kiryat Shemona (IL)

( * ) Notice: Subject to any disclaimer, the term of this patent is extended or adjusted under 35 U.S.C. 154(b) by 0 days.

(21) Appl. No.: 09/295,320

(22) Filed: Apr. 20, 1999

(30) Foreign Application Priority Data

Oct. 14, 1998 (IL) .......................................... 126565

(51) Int. Cl.[7] .......................... C08F 283/04; C08G 8/28; C08G 59/00; C08G 65/00
(52) U.S. Cl. ............................. 528/332; 528/73; 528/87; 528/170; 528/310; 528/322; 528/327; 528/341; 528/342; 528/376; 528/393; 528/403; 528/408; 525/403; 525/408; 525/422; 525/423; 525/504; 525/508; 525/533; 525/535; 424/DIG. 16
(58) Field of Search .................................... 525/403, 408, 525/422, 504, 433, 508, 533, 535; 528/73, 87, 341, 322, 327, 332, 310, 342, 170, 403, 408, 376, 393; 424/DIG. 16

(56) References Cited

U.S. PATENT DOCUMENTS

| | | | |
|---|---|---|---|
| 2,705,223 | 3/1955 | Renfrew et al. | 260/18 |
| 4,421,906 | 12/1983 | Waddill et al. | 528/111 |
| 5,756,596 * | 5/1998 | Pfaender et al. | 525/423 |
| 5,760,142 * | 6/1998 | Klee | 525/403 |

FOREIGN PATENT DOCUMENTS

WO 93/17062   9/1993 (WO).

OTHER PUBLICATIONS

Yasmin Sayed–Sweet et al., J. Mater. Chem. Jul. (1997) 7(7), 1199–1205 Hydrophobically modified poly(amidoamine) (PAMAM) denrimers: their properties at the air–water interface and use as nanoscopic container molecules.

* cited by examiner

Primary Examiner—P. Hampton-Hightower
(74) Attorney, Agent, or Firm—Frommer Lawrence & Haug, LLP; William S. Frommer; Mark W. Russell

(57) ABSTRACT

The present invention relates to a highly branched polyamide oligomer of the general formula (I) as hereinabove defined, to the process for preparing and branched oligomers and to different uses thereof. As well known to the man skilled in the art, the implementations and efficacy of the different polyamide oligomers may vary, depending on their structure and valency (reactive groups composition). Polyamide oligomers may be used, for example, as epoxy hardeners in the preparation of thermosetting compositions, as thermoplastic hot melt adhesives, as adhesion promoters and many other suitable applications. The highly branched oligomers disclosed have been shown to be highly efficient, for example, as epoxy hardeners, inter alia, in the formation of glue, lacquer, enamel or sealant mixtures.

46 Claims, No Drawings

HIGHLY BRANCHED OLIGOMERS, PROCESS FOR THEIR PREPARATION AND APPLICATIONS THEREOF

FIELD OF THE INVENTION

The present invention relates to highly branched polyamide oligomers, particularly of the general formula (I) as hereinafter defined, to a process for the preparation of such highly branched oligomers and to the different uses thereof.

BACKGROUND OF THE INVENTION

The versatility of polyamide-polyamine oligomers has led to their use in applications ranging from structural components to hot-melt adhesives. Part of this versatility may be attributed to the different processes of preparation and the many different polymeric backbones, all of which bestow the product with its specific properties. Evidently, the oligomers properties may be adjusted by manipulations of the components in the polycondensation or polyaddition reactions employed for their preparation.

Organic polymers are generally classified according to their structure as either linear, branched or cross-linked. In the case of linear polymers, the repeating units, also referred to as n-mers, are bivalent and are connected one to another in a linear sequence. The number of mers in a polymer, (n), varies and depends on the ratio between the reactants in the polycondensation/polyaddition reaction. In the case of branched polymers, at least some of the mers possess a valency greater than 2, such that the mers may be connected in a nonlinear sequence. The term "branching" usually indicates that the individual molecular units of the branches are discrete from the polymer backbone, yet have the same chemical constitution as the polymer backbone.

The simplest type of branching known in the art is the comb branching, wherein the branches are uniformly and regularly distributed on the polymer backbone, or irregular, wherein the branches are distributed in non-uniform or random fashion on the polymer backbone. Another type of branching is referred to as the cross-linked or network polymer, wherein the polymer chains are connected via tetravalent compounds. These types of polymer are widely used for curing.

The implementations of the different polyamides vary, depending on their structure and valency (reactive groups composition). In particular, polyamine-polyamide oligomers may be used as epoxy hardeners in the preparation of thermosetting compositions such as adhesives, e.g. coatings, as lacquers, sealants, and putty adhesives. Alternatively, the polyamine-polyamide oligomers may be used as thermoplastic hot-melt adhesives for metals, wood or concrete; as adhesion promoters for polyamides or polyvinylchloride plastics (PVC); for preparing polymer-coated cellophane and in the preparation of aluminum foil; as alcohol-soluble binding substances for the preparation of printing ink compositions; as well as in non-ionic softening agents or as anti-static agents.

Polyamide resins are mainly prepared by the polycondensation between fatty acid monomers and polyamines. Presently available polycondensation reactions result in the formation of low molecular weight quasi-linear oligomers (molecular weight of between 1,000 and 5,000) and require a stoichiometric excess amount of the di- or polyamine reactant.

The low molecular weight oligomers, which are usually in a liquid state at room temperature, are suitable as epoxy hardeners for glues, varnish-paints and putty materials. Since the physical properties of a resin, such as its strength, flexibility and adhesion properties, correlate with the resin's molecular weight, low molecular weight quasi-linear polyamine-polyamide oligomers may be disadvantageous for many applications. In addition, any change in the liquefaction temperature is significant, since it may result in destruction of the resin and loss of essential properties required for its processing.

To date, attempts to raise the molecular weight of branched oligomers failed, since they led to the decrease in their solubility in standard solvents and to the increase of their softening point (the temperature range in which the resin liquefies).

U.S. Pat. No. 5,756,596 relates to a process for increasing the molecular weight of polyamides, essentially without cross-linking, which process comprises blending the polyamide with a polyfunctional epoxy resin and a satirically hindered hydroxyphenylalkylphosphoric acid ester or half-ester and heating the blend to above the melting point (or the glass transition temperature) of the polyamide, in the absence of a catalyst of the type used in the polymerization of polyamides. The method described is advantageous only when using high molecular weight polyamides. In case low molecular polyamides are employed, highly branched polyamide-epoxy adducts are obtained, which are not compatible with epoxy resins.

German Patent No. DE 2,759,313 relates to polyaminoamide-epoxy adducts obtained by reacting an epoxy compound with an excess of an end-capped polyaminoamide compound comprising free amino groups, or by reacting such a polyaminoamide with an excess of the epoxy compound, the reactions being carried out in a non-aromatic solvent. Two adducts were obtained, the first contained linear or sparsely branched polymers, which, as already detailed above, are of disadvantageous, whereas the second adduct consisted of epoxy residues, thus rendering it unstable and unsuitable for use in the preparation dendripolyamides.

Japanese Patent No. 10 07,791 (98 07,791) relates to an adduct of epoxy resin with polyoxyalkylene amine used in the preparation of printing inks. The adduct being mainly linear is not suitable for the preparation of dendripolyamides.

Recently, a new group of polyamides, the dendripolyamides (highly branched polyamide oligomers, also referred to as dendrimers) has been developed [Newcome GR, et al., Dendric Molecules. Concepts, Synthesis and Perspectives. (1996) Ed. VCH Weinheim; Aoi K, et al., (1997) Macromol. Rapid. Commun. 18(10):945; Evenson SA, et al., (1997) Adv. Mater 9(14):1097]. Dendripolymers, by definition, exhibit higher concentrations of functional groups per nucleus, which renders them more active for their intended purposes.

'Star structured' polymers, developed more recently, are a class of dendripolyamides in which the individual branches radiate out from a core/nucleus. The star-branched polymeric adducts offer several advantages over the other linear or sparsely branched polymers. In addition to the higher concentration of functional groups per nucleus, star-branched polymers are often less sensitive to degradation. Such features become prominent in the manufacture of paints or in enhanced oil recovery. Furthermore, star-branched polymers, have relatively low intrinsic viscosity, even at high molecular weight.

To date, dendripolymers are prepared from a multifunctional core compound and an excess of a suitable reactant.

The resulting new multifunctional adduct is then further reacted with the excess of the reactant to obtain the branched product.

U.S. Pat. No. 5,760,142 relates to epoxide-amine dendrimers synthesized by a repetitive and step-wise addition reaction of epoxides comprising functional moieties which are available for conversion into amine groups followed by reaction of these groups to primary amino moieties. The amino terminated dendrimers are reacted with (2,3-epoxypropoxy)methacrylate, a monoepoxide and/or a monoisocyanante. The methacrylate terminated dendrimers are polymerizable using redox initiators and/or photoinitiators. The resulting dendrimers are describes as showing a very low volume shrinkage from that of the starting materials, on the order of less than about 5% by volume. These dendrimers have very limited uses and are particularly useful as polymerizable hot-curing materials. Furthermore, the process described is a complex multistage technology, which renders its products highly expensive.

Dendrimers may be used in a variety of applications, for example, as emulsifiers for oil/water emulsions; as viscosity modifying agents in aqueous formulations such as paints; as wet-strength agents in the manufacture of paper; as high efficiency proton scavengers; as components of calibration standards for electron microscopy; and in preparing size-selective membranes. When compared to linear or sparsely branched polyamides, the dendrimers exhibit improved adhesion to a variety of substrates, and improved flexibility and stability. Nonetheless, dendripolyamides prepared by the methodology described above, which are mostly of low molecular weight, are incompatible with most epoxy resins, and thus are disadvantageous.

Epoxy glues, which are one of many implementations for the dendripolyamides, are widely used both domestically and in various fields of modem industry. Such glues are prepared in the form of two multi-component parts that may be generally defined as part A and Part B. Part A commonly contains an epoxy resin and is compatible with additives. An amine hardener (usually a polyamide resin), a curing catalyst, and some special additives form part B. The production of epoxy glues or any other application involving epoxy compounds, in the form of two parts, is profitable for the manufacturer and the consumer. The two parts of the glue, being kept separately, have a long shelf life. In addition, the exact amount required for curing can be mixed only when needed.

Epoxy-polyamide mixtures are exposed to aggressive media and organic solvents. Presently, such mixtures are cured slowly at room temperatures and the gel time for a thin layer of glue is usually 90 to 120 minutes. However, 7 to 10 days are required to complete curing. In addition, the grasping time for such compositions may be between 5 to 30 minutes, via the addition of active cure catalysts. However, by accelerating the curing process, the durability, adhesion and other essential features of the cured material are reduced. Thus, there exists a need to develop a fast-grasping, but durable, curing agents, which is an aim of the present invention.

DETAILED DESCRIPTION OF THE INVENTION

The present invention relates to a highly branched oligomer of the general formula (I):

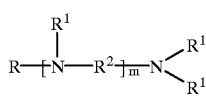

(I)

wherein m represents a number of from 1 to 5;

R represents a monovalent group selected from a linear or branched $C_1$–$C_{18}$ alkyl, cycloalkyl, aralkyl or aryl, which aryl group may be substituted with a halogen atom, or a linear or branched $C_1$–$C_{12}$ alkyl, hydroxy, alkoxy, haloalkyl group; or R or $R^1$ represent, independently, a monovalent group of general formula (II):

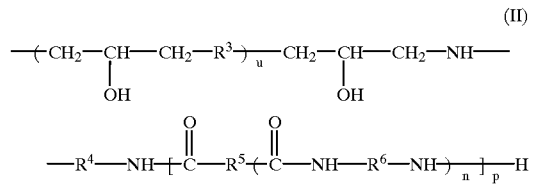

(II)

wherein p represents a number between 0.1 and 18.0;

u represents a number between 0.1 and 18.0;

n represents a number between 0.2 and 1.5;

$R^3$ represents (i) a bivalent dioxy group of the general formula (III):

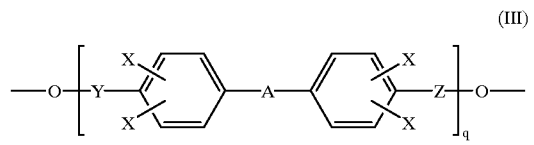

(III)

wherein q represents a number of from 1 to 20;

A represents a linear or branched alkylene or alkenylene, all of which may be substituted with one or more halogen atoms, or A represents a sulfonylene group;

Y and Z, being the same or different, represent a valency bond or a linear or branched alkylene or alkenylene, or a group of the general formula: —O—$R^7$—;

wherein, $R^7$ represents a linear or branched lower alkylene or alkenylene, all of which may be substituted with one or more hydroxyls; and X represents a hydrogen or a halogen atom or a lower alkyl;

(ii) a bivalent dioxy group of general formula (IV):

(IV)

wherein s represents a number of from 1 to 100 and $R^8$ represents a group selected from a linear or branched alkylene, alkenylene, cycloalkylene, cycloalkenylene or arylene, which group may be substituted with one or more alkyls or alkoxyls, and which aromatic ring or alkylene group may be substituted with one or more halogen atoms;

(iii) a bivalent group selected from a linear or branched alkylene, alkenylene, cycloalkylene, cycloalkenylene or arylene, which group may be substituted with one or more alkyls or alkoxyls, and which aromatic ring or alkylene group may be substituted with one or more halogen atoms; dioxy group of general formula (V):

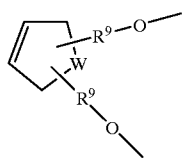

(V)

wherein

W represents a $C_1$–$C_3$ alkylene; and $R^9$ represents a linear or branched alkylene or alkenylene;

(iv) a bivalent group having the following formulae (VIIa) to (VIId):

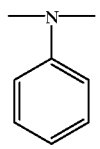

(VIIa) N,N-aniline

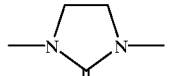

(VIIb) N,N'-(2-imidazolidone)

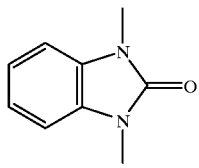

(VIIc) N,N'-(2-benze-2-imidazolidone)

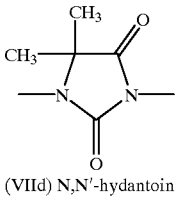

(VIId) N,N'-hydantoin all of which may be substituted with one or more linear or branched alkyls, haloalkyls, oxides, or halogen atoms; or (v) a biavlent dioxy group of general formula (VIII):

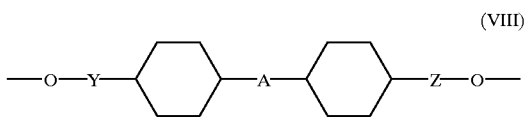

(VIII)

wherein A, Y and Z are as hereinbefore defined;

$R^4$ represents the group of the general formulae (Xa) or (Xb):

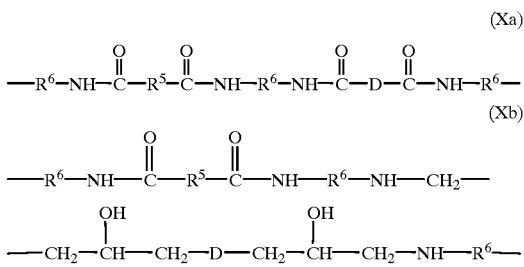

in which D represents a linear of branched dioxyalkylene, dioxyalkenylene, dioxycycloalkylene, dioxycycloalkenylene, dioxyarylalkenylene, sulfonylene, dioxyarylene, dioxyaralkylene, all of which may be substituted by one or more alkyls, hydroxyls, or halogen atoms, which cyclic groups may be monocyclic or polycyclic, or D represents a group of the general formula (VIII), wherein A, Y and Z are as hereinbefore defined;

$R^4$ or $R^6$, independently, represent a bivalent polyaminoalkylene group of the general formula —$(CH_2CH_2NH)_r$—$CH_2CH_2$—, wherein r is a number between 1 to 6;

$R^5$ represents a bivalent group of the general formula $C_tH_v$ in which t and v represent independently a number of from 1 to 100 and is selected from a linear or branched alkylene, alkenylene, cycloalkylene, cycloalkenylene, aralkylene;

$R^2$ represents a bivalent linear or branched alkylene or alkenylene, cycloalkylene, cycloalkenylene, arylene, aralkylene, or a group of general formula (XI):

—$(R^{10}$—$O)_k$—$R^{10}$—    (XI)

wherein $R^{10}$ represents a lower alkylene which may be substituted by one or more halogen atoms, and k is a number of between 1 to 20 or $R^2$ represents a bisamide of the general formula (XII):

(XII)

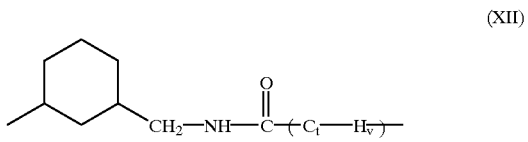

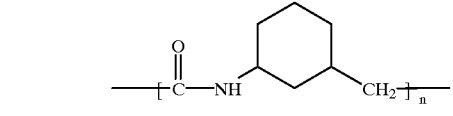

wherein t, v and n are as hereinbefore defined, which bisamide may be substituted with one or more linear or branched alkyls, or with halogen atoms. Preferably, when $R^2$ represents the bisamide group above, $R^5$ represents the group $C_tH_y$, being the same as the bridge group in the bisamide radical.

The term 'highly branched' for purposes herein is that determined by such considerations as are known in the art. Thus, any polyamide oligomer which is not linear or sparsely branched and is within ambit of the appended claims, may encompass part of the present invention.

By the terms cycloalkyl, aryl, aralkyl, or the bridging form thereof, is meant any mono-, bi- or polycyclic compound, and include any heteroatom-containing derivatives of the same.

The halogen atoms which may substitute the different groups of the oligomer of the present invention, are preferably chlorine or bromine atoms. Nonetheless, fluorine or iodine may be present.

The branched oligomers (dendripolymers) disclosed in the following Examples are characterized by several chemical and physical parameters known to the man of the art.

In principle, the reaction product of each synthesis step was characterized by its general formula, deduced from the reaction employed. The composition of the resulting mixture was determined by gas-liquid chromatography. In addition, each reaction product was characterized by several physical parameters. These parameters were obtained by conventional methods, known to the man skilled in the art. The principle of each method employed is summarized hereinafter.

Saponification value—determined by mixing a fixed amount of the product, with a titrant of KOH, followed by heating the mixture, to allow a reaction to occur between the product and the KOH, after which, the residual KOH is titrated with HCl. Thus, the saponification value is given as mg KOH per gram product;

Average molecular weight—determined by a conventional cryscopy method, employing 4-bromophenol. For the dendripolyamides, the average molecular weight was estimated from the stoichiometric ratio between the reactants, and therefore is theoretical;

Acid number—determined by titration of the product with a known solution of KOH, however, may be obtained also by titration with NaOH. Thus, the acid number is given in mgKOH per gram product;

Gram equivalent carboxyl groups (GE)—deduced from the product's molecular weight (MW) and functionality (f). Accordingly, GE=MW/f is provided in gram (per mole) units;

Amine value—determined by titration of the product's solution with a known solution of HBr, in glacial acetic acid;

Epoxy group percentage—determined by titration of the product's solution with a known solution of HBr, in glacial acetic acid;

H-equivalent weight—deduced from the percentage of the primary and secondary amine groups and the MW of the product.

In addition, the nature of each oligomer obtained, as a hardener of epoxy resins, was determined. In principle, the dendripolyamide and epoxy resins, and, optionally, other additives, were mixed to obtain either a lacquer, a glue, an enamel or a sealant substance. The quality of the epoxy mixtures was then evaluated by conventional methods known to the man skilled in the art. In general, the following parameters were determined:

Gel time—determined by the time point (min.), at room temperature (or 25° C.), in which the composition looses its fluidity and is transformed into a gel-like substance. This parameter reflects the activity of the mixture.

Resistance—resistance of the applied composition to an impact, determined herein by the resistance of a substance, coated with the tested mixture, to an impact on either the coated side of the substance, referred to herein after as the direct impact, or on the uncoated side of the substance, referred to herein after as the indirect impact;

Hardness—determined by the ability of one solid to scratch another, at different temperatures. In the following Examples, different types of pencils (hardness 2H>H>B) were employed as the scratching devices, however, any other suitable device may be employed. Alternatively, the hardness of the cured compositions was determined by dynamic tests, known to the man of the art, utilizing a Shore scleroscope, which measures the rebound hardness;

Water absorption—determined by the increase in weight of a substance coated with the tested composition, after immersion in water for 24 hrs, at room temperature;

Corrosion—determined by the visible corrosion, if any, of a substance coated with the tested composition;

Shear strength—determined by the ability of a material to withstand shear stress (ASTM D1002, units: kg/cm$^2$) at different temperatures;

Glass transition Temperature ($T_g$)—determined by the temperature (° C.) in which an amorphous region of a partially crystalline polymer is changed from a viscous or rubbery condition to a hard and relatively brittle one, when a pressure of 10 kg/cm2 is intermittently applied thereon;

Compressive strength—determined by the maximum compressive stress (in Pa.s) a material can withstand without break;

Tensile strength—determined by the maximum strength a material can withstand without tearing when subjected to a stretching load.

Tensile elongation—determined by the percentage of elongation of a material without tearing when subjected to a stretching load.

Flexural strength- determined by the resistance of a material to fracture when a load is applied thereto and is provided in MPa or kg/cm$^2$ units.

Impact strength—determined by the energy (kJ/m$^2$) necessary to fracture a material (also referred to as impact energy);

Peel strength—determined by the ability of a material to withstand peel stress (ASTM D1002 standard, units kg/cm).

The following Examples will demonstrate the ability of the dendripolyamides of the present invention to function as hardeners of epoxy resin for different glues, binders, sealant materials, putties etc. Such hardeners provide the polymeric materials with increased flexibility and thermal stability.

A range of epoxy-polyamide glues may be prepared from the dendripolyamides of the present invention, for example, chemical steady epoxy-thiokol glues comprising the new polyamide hardeners or highly durable epoxy rubber glues which will be based on the dendripolyamides. These and other high-strength, flexible glues, will be self-grasping glues which can be cured at room temperature, at regulated curing rate.

Notwithstanding the above specific applications, the dendripolyamides of the present invention may be useful also in other applications. Examples for such other applications are the use of the dendripolyamides of the invention as wet-strong additives which may increase the strength of wet papers, as hot-melt adhesives, which, due to their high density and high content of functional groups, may provide materials with increased adhesion properties, as binders in printing inks which will bestow the ink with resistance to water or any other solvent, as softening agents for rubbers, as flocculation agents, in the preparation of coating materials and putties, or any other suitable application.

In one preferred embodiment, the invention relates to highly branched oligomers of the general formula (I), wherein when R and $R^1$ are different, R represents a monovalent group selected from a lower alkyl, a cyclohexyl, a phenyl or a benzyl, which cyclohexyl, phenyl or benzyl may be substituted with one or more $C_1$–$C_{12}$ alkyl or alkoxy groups and $R^1$ represents a group of the general formula (II). More preferably, when R and $R^1$ are different, R represents a butyl, an octyl or a cyclohexyl group.

In addition, in a preferred embodiment, the invention relates to highly branched oligomers of the general formula (I), wherein $R^3$ represents the group of the general formula (III) or (VII) as hereinbefore defined, in which A represents a lower alkylene; Y and Z represent a valency bond and q is equal to 1, in which each ring independently may be substituted with one or more halogen atoms.

Alternatively, $R^3$ represents the group of the general formula —O—$R^7$—, in which $R^7$ is a lower alkylene which may be substituted with one of more hydroxyls. In yet a further alternative, $R^3$ represents the group of the general formula (IV) as hereinbefore defined, in which $R^8$ represents a lower alkylene selected from 1,2-ethylene, 1,2-isopropylene, 1,4-butylene and 1,6-cyclohexylene, all of which may be substituted with one or more halogen atoms and s represents a number of between 1 to 15; or $R^8$ represents an arylene group selected from 1,3- or 1,4-phenylene, 1,4-xylylene, 1,8-, 1,5- 2,7- or 3,7-naphthylene or 9,10-anthracylene, all of which may be substituted with one or more halogen atoms, and s is equal to 1.

However, $R^8$ may represent the group selected from 1,2-ethylene, 1,4-butylene, or 1,6-hexylene and when s is greater than 1, $R^8$ may represent the group selected from 1,2-ethylene, 1,2-isopropylene, or 1,2-(3-chloroisopropyl)ene.

In yet a further embodiment, the invention relates to highly branched oligomers of the general formula (I), wherein $R^3$ represents the group of the general formula (V) as hereinbefore defined, in which W and $R^9$ both represent a methylene; or $R^3$ represents the group selected from N,N-aniline, N,N'-(2-imidazolidone), N,N'-hydantoin, N,N'-(benze-2-imidazolidone), all of which may be substituted with one or more lower alkyls or halogen atoms.

In addition, $R^3$ may be selected from the group consisting of 2,2-[bis(4-oxyphenyl)] propylene, bis(4-oxyphenyl)methylene, 2,2-[bis(3,5-bromo-4-oxyphenyl)]propylene, 1,3-or 1,4-phenylene, 1,8-dioxyphenylene, 1,4-[bis(oxymethyl)]phenylene, 1,1-[bis(oxymethyl)]cyclohex-3-enylene, 1,2-dioxyethylene, (1,3,3-trimethylcyclohex-1-yl-5-ene)methylene, N,N-aniline, N,N-(2,4,6-tribromoaniline), N,N'-(5,5'-dimethyl)hydantoin, 1,2(2,4,6-tribromo)dioxyphenylene, 1,4-dioxybutylene, 1,2-dioxypropylene or 1,6-dioxyhexylene.

The invention also relates preferably to highly branched oligomers of general formula (I), wherein $R^4$ or $R^6$ represent independently a polyaminoalkylene of the general formula —(CH$_2$CH$_2$NH)$_r$—CH$_2$CH$_2$—, wherein r is a number of between 1 to 6, or when $R^4$ and $R^6$ are different, $R^4$ represents the group of the general formula (Xa) in which D is selected from 1,8-octylene, 1,2-(4-methyl)cyclohex-4-enylene, or 1,2-bicyclo[2.2.1]hept-2-enylene, or $R^4$ represents the group of the general formula (Xb) in which D is selected from bis(4-oxyphenyl)sulfonylene, 1,6-dioxyhexylene, or 2,2-bis(4-oxyphenyl)-1,1,1,3,3,3-hexafluoropropylene.

Furthermore, the invention relates to highly branched oligomers of the general formula (I), wherein $R^5$ is a product of a dienic Diels-Alder or an enic Alder-Ene reaction between fatty acids comprising from 15 to 22 carbon atoms or lower alkyl esters of such acids, or $R^5$ represents an alkylene of the general formula —(C$_t$H$_v$)— in which t and v represent independently numbers of between 1 to 100, or [1,4]-, [1,3]-, or [1,2]-phenylene, [1,2]-cyclohexylene, [1,2]-cyclohex-4-enylene, 1,2-(4-methyl)cyclohex-4-enylene, 1,2-bicyclo[2.2.1]hept-2-enylene, 1,2-(4-methylbicyclo[2.2.1]hept-2-enylene).

Yet further, the invention relates preferably to highly branched oligomers of the general formula (I) in which $R^2$ represents a lower alkylene, 1,4- or 1,3- phenylene, 1,3- or 1,4-xylylene; 1,4- or 1,3-cyclohexylene, (1,1,3-trimethylcyclohex-5-yl)methylene, the group of the general formula (XI) in which $R^{10}$ represents isopropylene and k is a number of between 1 to 10, or the bisamide of the formula:

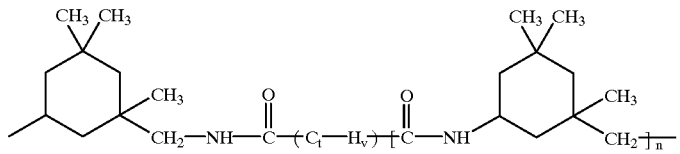

wherein t, v and n are as hereinbefore defined.

In particular, the invention relates to a highly branched oligomer having the general formula (I), wherein m is equal to 1, R and $R^1$ are the same and represent the group of general formula (II), in which p and u are equal to 1, n is equal to 0.75; $R^3$ represents 2,2-[bis(4-oxyphenyl)]propylene; $R^4$ and $R^6$ are the same and represent —(CH$_2$CH$_2$NH)$_3$—CH$_2$CH$_2$—; $R^5$ represents the average group —(C$_{29.8}$H$_{55.2}$)—; and $R^2$ represents a 1,2-ethylene.

In addition, the invention relates particularly to a highly branched oligomer having the general formula (I), wherein m is equal to 1, and R and $R^1$ are the same and represent the group of general formula (II), in which p is equal to 1, u is equal to 1.5, and n is equal to 1.07; $R^3$ represents 2,2-[bis(4-oxyphenyl)]propylene; $R^4$ and $R^6$ are the same and represent —(CH$_2$CH$_2$NH)$_2$—CH$_2$CH$_2$—; $R^5$ represents the average group —(C$_{35.2}$H$_{65.2}$)—; and $R^2$ represents 1,6-hexylene.

Furthermore, the invention relates specifically to a highly branched oligomer having the general formula (I), wherein m is equal to 1, R represents cyclohexyl, $R^1$ represents the group of general formula (II), in which p is equal to 1, u is equal to 6.18, n is equal to 1.05; $R^3$ represents 2,2-[bis(4-oxyphenyl)]propylene; $R^4$ and $R^6$ are the same and represent the group —(CH$_2$CH$_2$NH)$_2$—CH$_2$CH$_2$—; $R^5$ represents the average group —(C$_{34.8}$H$_{64.4}$)—; and $R^2$ represents 1,3-propylene.

Furthermore, the invention relates to a highly branched oligomer having the general formula (I), wherein m is equal to 1, R and $R^1$ are the same and represent the group of general formula (II), in which p is equal to 1, u is equal to 1.18 and n is equal to 1.45; $R^3$ represents 2,2-[bis(4-oxyphenyl)]propylene; $R^4$ and $R^6$ are the same and represent the group —$CH_2$—$CH_2$—NH—$CH_2$—$CH_2$—; $R^5$ represents the group —$(C_{41.6}H_{81.2})$—; and $R^2$ represents (1,3,3-trimethylcyclohex-5-yl)methylene.

The invention also relates preferably to a highly branched oligomer having the general formula (I), wherein m is equal to 3, R and $R^1$ are the same and represent the group of general formula (II), in which p is equal to 1.6, u is equal to 4.31, and n is equal to 1; $R^3$ represents 1,2-dioxypropylene; $R^4$ and $R^6$ are the same and represent the polyamine of the formula —$(CH_2CH_2NH)_2$—$CH_2CH_2$—; $R^5$ represents the group —$(C_{34.0}H_{66.4})$—; and $R^2$ represents 1,2-ethylene.

Under the same scope, the invention also relates to a highly branched oligomer having the general formula (I), wherein m is equal to 1, R and R are the same and represent the group of general formula (II), in which p is equal to 2.14, u and n are both equal to 1; $R^3$ represents the 1,3-dioxyphenylene; $R^4$ and $R^6$ are the same and represent the polyamine of formula —$(CH_2CH_2NH)_3$—$CH_2CH_2$—; $R^5$ represents the average group —$(C_{34.0}H_{66.4})$—; and $R^2$ represents 1,3-phenylene.

Additionally, the invention relates to a highly branched oligomer of the general formula (I), wherein m is equal to 4, R and $R^1$ are the same and represent the group of general formula (II), in which p and u are both equal to 1, n is equal to 0.5; $R^3$ represents the group 1,4-dioxybutylene; $R^4$ being different from $R^6$, represents the group of general formula (Xa) in which D is a 1,8-octylene; whereas $R^6$ represents the polyamine group —$(CH_2CH_2NH)_3$—$CH_2CH_2$—; $R^5$ represents the average group —$(C_{29.8}H_{55.2})$—; and $R^2$ represents 1,2-ethylene.

In another preferred embodiment, the invention relates to a highly branched oligomer of the formula (I), wherein m is equal to 1, R and $R^1$ are the same and represent the group of general formula (II), in which p and u are both equal to 1, n is equal to 1.14; $R^3$ represents the group 1,1-[bis(oxymethyl)]cyclohex-3-enylene; $R^4$ represents the group of general formula (Xa) in which D represents 1,2-(4-methyl)cyclohex-4-enylene; $R^5$ represents the average group —$(C_{35.2}H_{65.2})$—; $R^6$ represents —$(CH_2CH_2NH)_2$—$CH_2CH_2$—; and $R^2$ represents 1,4-xylylene.

Still further, the invention relates to a highly branched oligomer having the general formula (I), wherein m is equal to 1, R and $R^1$ are the same and represent the group of general formula (II), in which p is equal to 1.66, u and n are equal to 1; $R^3$ represents the group 2,2-bis[3,5-dibromo-4-oxyphenyl)propylene; $R^4$ represents the group of general formula (Xa), in which D represents 1,2-bicyclo[2.2.1]hept-4-enylene; $R^5$ represents the average group —$(C_{34.0}H_{66.4})$—; $R^6$ represents the group —$(CH_2CH_2NH)_3$—$CH_2CH_2$—; and $R^2$ represents 1,4-cyclohexylene.

In the same aspect, the invention also relates to a highly branched oligomer having the general formula (I), wherein m is equal to 1, R and R are the same and represent the group of general formula (II) in which p and u are equal to 1, n is equal to 1.14; $R^3$ represents N,N-(2,4,6-tribromoaniline); $R^4$ represents the group of general formula (Xb) in which D represents bis(4-oxyphenyl) sulfonylene; $R^5$ represents the average group —$(C_{35.2}H_{65.2})$—; $R^6$ represents the group —$(CH_2CH_2NH)_2$—$CH_2CH_2$—; and —$R^2$ represents the polyisopropylene glycol of the formula —[$CH_2CH(CH_3)$—O]$_{5.62}$—$CH_3CH(CH_3)$—.

Moreover, the invention relates to a highly branched oligomer of the general formula (I), wherein m is equal to 1, R and $R^1$ are the same and represent the group of general formula (II) in which p and u are both equal to 1, n is equal to 1.10; $R^3$ represents an N,N-aniline; $R^4$ represents the group of general formula (Xb) in which D represents 1,6-dioxyhexylene; $R^5$ represents the average group —$(C_{34.8}H_{64.4})$—; $R^6$ represents —$(CH_2CH_2NH)_2$—$CH_2CH_2$—; and $R^2$ represents the bisamide group:

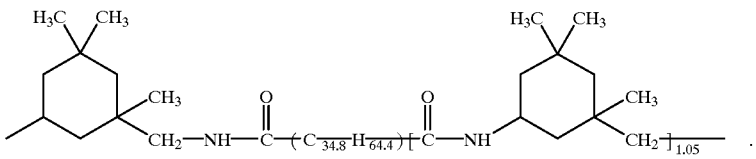

However, also within the scope of this aspect of the invention there exists a highly branched oligomer of the formula (I), wherein m is equal to 1, R and $R^1$ are the same and represent the group of general formula (II) in which p is equal to 1.7, u and n are both equal to 1; $R^3$ represents N,N'-(5,5'-dimethyl)hydantoin; $R^4$ represents the group of general formula (Xb) in which D represents 2,2'-[bis(4-oxyphenyl)-1,1,1,3,3,3-hexafluoropropylene; $R^5$ represents the average group —$(C_{35.2}H_{65.2})$—; and $R^6$ represents —$(CH_2CH_2NH)_2$—$CH_2CH_2$—; and —$R^2$ represents p-tolylene.

At Evidently, the invention thus relates to any highly branched oligomer of the general formula (I) substantially as described in the hereinafter examples.

In a second aspect, the invention relates to a process for the preparation of a highly branched oligomer comprising the steps of (a) dissolving a mole of an n-functional polyamine compound and n moles of a diepoxy compound in a suitable aprotic, polar solvent and mixing the same, wherein, n represents a number of from 3 to 15; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of an n-functional polyepoxy adduct; (d) mixing n moles of a suitable polyamine-polyamide oligomer, dissolved in a suitable solvent, with 1 mole of the n-functional polyepoxy adduct obtained in (c); (e) optionally further mixing the mixture obtained in (d), for at least 1 hour, at room temperature; (f) heating the mixture obtained in (d) or in (e) to a temperature of between 60° C. to 100° C., for at least 2 hrs, thus allowing the formation of a highly branched oligomer of the general formula (I); and (g) optionally, isolating the highly branched oligomer obtained in (f). Isolation methods are well known to the man of the art and include, inter alia, evaporation of the solvents within the reaction mixture by heating the same to above the boiling temperature of the solvents, thereby isolating the desired dendripolyamides. Since the latter are thermoplastic materials, their integrity will be retained during heating.

As will be demonstrated in the following Examples, by the process of the invention, highly branched dendrimers may be obtained, which is an advantage over the known processes, resulting predominantly with the formation of linear or semi-linear products. The essence of the process developed by the inventor resides in the specific molar ratio between reactants which allows the formation of the desired branched polymers. In the process of the invention, the amines employed are preferably tri or polyvalent core-making amines, and those containing at least one primary and one secondary amine groups. Accordingly, the n-functional polyamine utilized by the process of the invention may be represented by the general formula (I), wherein m and $R^2$ are as defined hereinbefore and R represents a hydrogen atom, or a monovalent group selected from a linear or branched $C_1$–$C_{12}$ alkyl, cycloalkyl, aralkyl or aryl, which aryl group may be substituted with at leat one halogen atom, or with at least one linear or branched $C_1$–$C_{12}$ alkyl, hydroxy, alkoxy or haloalkyl group and $R^1$ represent a hydrogen group.

Further, in the process of the invention, the diepoxy compound may be represented by the following general formula (XIII):

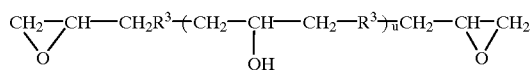

(XIII)

wherein u and $R^3$ are as hereinbefore defined.

In addition, the n-functional polyepoxy adduct obtained by the process of the invention may be represented by the following general formula (XIV):

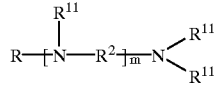

(XIV)

wherein m, R and $R^2$ are as hereinbefore defined. In addition, R or $R^{11}$ may represent, independently, a monovalent group of the following general formula (XV):

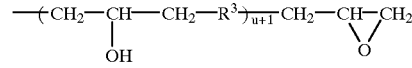

(XV)

wherein $R^3$ is as hereinbefore defined.

The polyamide-polyamine resins which must contain unreacted amine groups, are preferably those prepared from a reaction with polymeric fatty acids, the latter resulting from the polymerization of oils or the free acids thereof, via a dienic Diels-Alder or an enic Alder-Ene reaction to provide a mixture of dibasic and higher polymeric fat acids. The acids are often referred to in the art as dimers, trimers and so forth. In place of this method of polymerization any other method of polymerization may be employed, whether the resultant polymer possesses residual unsaturation or not. The resulting acid mixture will be that containing predominant proportion of dimer acids, a small quantity of trimer and higher polymeric fatty acids and some residual monomers. The ratio between the reactants in the disclosed process is known in the art as a topological ratio.

Thus, the polyamine-polyamide oligomer according to the invention may be represented by the following general formula (XVI):

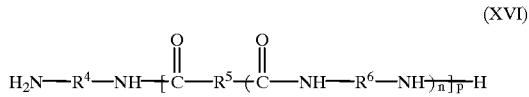

(XVI)

wherein p, n, $R^4$, $R^5$ and $R^6$ are as hereinbefore defined. Such oligomers may be prepared by any suitable process. According to one preferred process, the polyamine-polyamide oligomers are obtained by:- (i) preparing fatty acid monomers by hydrolysis or methanolysis of a suitable oil; (ii) oligomerizing the fatty acid monomers obtained in step (i) in the presence of a suitable catalyst; (iii) optionally, polycondesing the oligomer obtained in step (ii) with a small excess of a suitable amine; and (iv) optionally further reacting the product of step (iii) with a suitable epoxy compound to obtained the desired polyamide-polyamine oligomer.

The oil employed in the preparation of the polyamine-polyamide oligomer will be such that by hydrolysis or methanolysis thereof, fatty acid monomers are produced. Thus, suitable oils according to the invention may be selected from the group consisting of bean oil, sunflower oil, castor oil, soya oil, cotton oil, anise oil, coconut oil or rape oil.

The aprotic polar solvent is preferably a solvent having a boiling point lower than 60° C. and is preferably an aromatic hydrocarbon selected from toluene, xylene, ethylbenzene or isopropylbenzen; an ether selected from dibutyl ether, dihexyl ether, anisole, phenetole or dioxane; or an ester selected from ethyl acetate, butyl acetate, dibutyl phthalate, dioctyl phthalate, tricresyl phosphate or any other aprotic solvent selected from nitromethane, nitroethane, N-methyl pyrrolidinone, dialkylformamide, dialkylacetamide, dialkylphthalate, dialkylsebacate or any other solvent suitable for carrying out the process of the invention. Naturally, any mixture of such solvents may also be used in order to perform the process of the invention.

In addition, the preferred solvent employed in step (d) of the process is an alcohol, and more preferably and alcohol selected from ethyl alcohol, isopropyl alcohol, propyl alcohol, butyl alcohol, benzyl alcohol, ethylene glycol, diethylene glycol, poly(oxyethylene)glycol, poly(oxypropylene)glycol, glycerol, or erythritol. Alternatively, the solvent may be an aromatic solvent, such as phenol, cresol, xylenol, or dioxydiphenyl, or tetrahydrofuran, or any mixture of such solvents.

By the process of the invention, any of the branched oligomers according to the invention may be prepared. When employed as hardeners of epoxy resins, oligomers having a molecular weight of between 20,000 and 30,000 are preferred. Such oligomers are mostly rubber like materials.

Thus, according to a first embodiment of the invention a dendripolyamide E is prepared. The process for the preparation of this dendripolyamide E comprises the steps of (a) dissolving for each mole of ethylenediamine 4 moles of diglycidyl ether of Bisphenol A in a sufficient amount of ethyl acetate and mixing the same; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of a 4-functional polyepoxy adduct; (d) mixing each mole of the 4-functional polyepoxy adduct obtained in step (c) with 4 moles of a polyamine-polyamide oligomer dissolved in a ethyl alcohol; (e) optionally further mixing the mixture obtained in (d), for at least 1 hour, at room temperature; (f) heating the mixture obtained in (d) or in (e) to a temperature of between 60° C. to 100° C., for at least 2 hrs, thus allowing the formation of the dendripolyamide E; and (g) optionally, isolating the dendripolyamide E obtained in (f).

According to this embodiment of the invention, the polyamine-polyamide oligomer may be obtained by (i) methanolysing bean oil to obtain predominantly fatty acid monomers; (ii) oligomerizing the monomers obtained in (i), in the presence of adipic acid and activated aluminum oxide, thus obtaining predominantly dimers thereof; and (iii) polycondensing the dimers obtained in step (ii) with from about 5% to about 20% excess of tetraethylenepentamine to give a polyamide-polyamine oligomer;

According to a second embodiment of the invention, the process may be employed for the preparation of dendripolyamide H. Accordingly, the process will comprise the steps of (a) dissolving for each mole of hexamethylenediamine 4 moles of Epon 834, poly (Bisphenol A-co-epichlorohydrin) glycidyl end-capped in 1,4-dioxane and 2-propanol and mixing the same; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of a 4-functional polyepoxy adduct; (d) mixing each mole of the 4-functional polyepoxy adduct obtained in (c), with 4 moles of a polyamine-polyamide oligomer dissolved in ethanol; (e) optionally further mixing the mixture obtained in (d), for at least 1 hour, at room temperature; (f) heating the mixture obtained in (d) or in (e) to a temperature of between 60° C. to 100° C., for at least 2 hrs, thus allowing the formation of the dendripolyamide H; and (g) optionally, isolating the dendripolyamide H obtained in (f).

According to this second embodiment, the polyamine-polyamide oligomer may be obtained by (i) preparing fatty acid monomers by methanolysis of bean oil; (ii) oligomerizing the monomers obtained in (i) in the presence of sebacic acid and activated aluminum oxide, thus obtaining predominantly dimers thereof; (iii) polycondensing the oligomer obtained in step (ii) with from about 5% to about 20% triethylenetetramine to give the desired polyamide-polyamine oligomers.

Yet, according to a third embodiment of the invention, dendripolyamide C may be prepared. The process will include the steps of (a) dissolving for each mole of N-cyclohexyl-1,3-propanediamine and 3 moles of Epon 1004 poly (Bisphenol A-co-epichlorohydrin) glycidyl end-capped in butyl acetate and mixing the same; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of a 3-functional polyepoxy adduct; (d) mixing each mole of the 3-functional polyepoxy adduct obtained in (c) with 3 moles of a polyamine-polyamide oligomer dissolved in 2-propanol; (e) optionally further mixing the mixture obtained in (d), for at least 1 hour, at room temperature; (f) heating the mixture obtained in (d) or in (e) to a temperature of between 60° C. to 100° C., for at least 2 hrs, thus allowing the formation of the dendripolyamide C; and (g) optionally, isolating the dendripolyamide C obtained in (f).

The polyamine-polyamide oligomer may be obtained by:-(i) preparing fatty acid monomers by methanolysis of sunflower oil; (ii) oligomerizing the monomers obtained in (i) in the presence of terephthalic acid and activated aluminum oxide, thus obtaining predominantly dimers thereof; (iii) polycondensing the oligomer obtained in step (ii) with from about 5% to about 20% triethylenetetramine to give the desired polyamide-polyamine oligomer.

In addition, the process of the invention may be employed for the preparation of dendripolyamide I which is within the scope of a fourth embodiment of the invention. Accordingly, the process will comprise the steps of:- (a) dissolving for each mole of isophoronediamine 4 moles of Epon 828 poly (Bisphenol A-co-epichlorohydrin) glycidyl end-capped in butyl acetate and mixing the same; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of a 4-functional polyepoxy adduct; (d) mixing 4 moles of a polyamine-polyamide oligomer, dissolved in 2-propanol, with a mole of the 4-functional polyepoxy adduct obtained in (c); (e) optionally further mixing the mixture obtained in (d), for at least 1 hour, at room temperature; (f) heating the mixture obtained in (d) or in (e) to a temperature of between 60° C. to 100° C., for at least 2 hrs, thus allowing the formation of the dendripolyamide I; and (g) optionally, isolating the dendripolyamide I obtained in (f).

The polyamine-polyamide in accordance to this embodiment may be obtained by (i) preparing fatty acid monomers by methanolysis of castor oil; (ii) oligomerizing the monomers obtained in (i) in the presence of salicylic acid and activated aluminum oxide, thus obtaining predominantly dimers thereof; (iii) polycondensing the oligomer obtained in step (ii) with from about 5% to about 20% diethylenetriamine to give the desired polyamide-polyamine oligomer.

Dendripolyamide T may also be prepared by the process of the invention, which process will then comprise the steps of:- (a) dissolving for each mole of triethylenetetramine 6 moles of poly(propylene glycol)diglycidyl ether in ethyl acetate and mixing the same; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of a 6-functional polyepoxy adduct; (d) mixing about 6 moles of Versamide 140 polyamino-polyamide oligomer dissolved in 2-propanol, with a mole of the 6-functional polyepoxy adduct obtained in (c); (e) optionally further mixing the mixture obtained in (d), for at least 1 hour, at room temperature; (f) heating the mixture obtained in (d) or in (e) to a temperature of between 60° C. to 100° C., for at least 2 hrs, thus allowing the formation of the dendripolyamide T; and (g) optionally, isolating the dendripolyamide T obtained in (f).

Further, the process of the invention may be employed for the preparation of dendripolyamide MP. Accordingly, the process will comprise the steps of:- (a) dissolving for each mole of 1,3-phenylenediamine 4 moles of resocinol diglycidyl ether in dioxane and mixing the same; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of a 4-functional polyepoxy adduct; (d) mixing about 4 moles of a Versamide 125, polyamino-polyamide oligomer dissolved in dioxane, with a mole of the 4-functional polyepoxy adduct obtained in (c); (e) optionally further mixing the mixture obtained in (d), for at least 1 hour, at room temperature; (f) heating the mixture obtained in (d) or in (e) to a temperature of between 60° C. to 100° C., for at least 2 hrs, thus allowing the formation of the dendripolyamide MP; and (g) optionally, isolating the dendripolyamide MP obtained in (f).

Alternatively, the process of the invention may be employed for the preparation of dendripolyamide TP. Accordingly, the process will comprise the steps of:- (a) dissolving for a mole of tetraethylenepentamine 7 moles of 1,4-butanediol diglycidyl ether in ethyl acetate and mixing the same; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of a 7-functional polyepoxy adduct; (d) mixing about 7 moles of a suitable polyamine-polyamide oligomer, dissolved in isopropyl alcohol, with a mole of the 7-functional polyepoxy adduct obtained in (c); (e) optionally further mixing the mixture obtained in (d), for at least 1 hour, at room temperature; (f) heating the mixture obtained in (d) or in (e) to a temperature of between 60° C. to 100° C., for at least 2 hrs, thus allowing the formation of the dendripolyamide TP; and (g) optionally, isolating the dendripolyamide TP obtained in (f).

The polyamine-polyamide oligomer utilized in the preparation of dendripolyamide TP may be obtained by (i) preparing fatty acid monomers by methanolysis of bean oil; (ii) oligomerizing the monomers obtained in (i) in the presence of adipic acid and activated aluminum oxide, thus obtaining predominantly dimers thereof; (iii) polycondensing the oligomer obtained in step (ii) with from about 5% to about 20% tetraethylenepentamine to give an initial polyamide-polyamine oligomer; and (iv) oligomerizing the initial polyamide-polyamine oligomer obtained in step (iii) with sebacic acid thus forming predominantly polyamide-polyamine trimers as required for the preparation the TP dendrimer.

Furthermore, within the scope of the present invention, dendripolyamide X may be prepared. The process will then comprise the steps of:- (a) dissolving a mole of xylylendiamine and 4 moles of 1,1-dioxymethyl cyclohexene 4-diglycidyl ether in benzyl alcohol and mixing the same; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of a 4-functional polyepoxy adduct; (d) mixing about 4 moles of a polyamine-polyamide oligomer, dissolved in tetrahydrofuran, with a mole of the 4-functional polyepoxy adduct obtained in (c); (e) optionally further mixing the mixture obtained in (d), for at least 1 hour, at room temperature; (f) heating the mixture obtained in (d) or in (e) to a temperature of between 60° C. to 100° C., for at least 2 hrs, thus allowing the formation of the dendripolyamide X; and (g) optionally, isolating the dendripolyamide X obtained in (f).

The polyamine-polyamide oligomer employed for the preparation of the X dendrimer are in fact trimers which may be obtained by (i) methanolysing bean oil into fatty acid monomers; (ii) oligomerizing the monomers obtained in (i) in the presence of sebacic acid and activated aluminum oxide, thus obtaining predominantly dimers thereof; (iii) polycondensing the oligomer obtained in step (ii) with from about 5% to about 20% excess of triethylenetetramine to give an initial polyamide-polyamine oligomer; and (iv) further oligomerizing the initial polyamide-polyamine oligomer obtained in step (iii) with methyltetrahydrophthalic anhydride to give predominantly the desired polyamide-polyamine trimers.

Alternatively, the process of the invention may be employed for the preparation of dendripolyamide CD, which process will then comprise the steps of:- (a) dissolving a mole of 1,4-diaminocyclohexane in ethyl alcohol and 4 moles of 3,3',5,5'-tetrabromobisphenol A diglycidyl ether in butyl acetate and mixing the same; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of a 4-functional polyepoxy adduct; (d) mixing about 4 moles of a polyamine-polyamide oligomer, dissolved in ethyl alcohol, with a mole of the 4-functional polyepoxy adduct obtained in (c); , which polyamine-polyamide oligomer may be obtained by oligomerizing a commercially available epoxy compound, Hardener 825, polyamino-polyamide oligomer with 5-norborone 2,3-dicarboxylic anhydride to obtain predominantly trimers thereof; (e) optionally further mixing the mixture obtained in (d), for at least 1 hour, at room temperature; (f) heating the mixture obtained in (d) or in (e) to a temperature of between 60° C. to 1 00° C., for at least 2 hrs, thus allowing the formation of the dendripolyamide CD; and (g) optionally, isolating the dendripolyamide CD obtained in (f).

Yet, alternatively, the process may be employed for the preparation of dendripolyamide PGA, which process comprises the steps of:- (a) dissolving a mole of poly(propylene glycol)bis(2-aminopropyl)ether and 4 moles of diglycidyl 2,4,6-tribromoaniline in butyl acetate and mixing the same; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of a 4-functional polyepoxy adduct; (d) mixing about 4 moles of a polyamine-polyamide oligomer, dissolved in ethyl alcohol, with a mole of the 4-functional polyepoxy adduct obtained in (c); (e) optionally further mixing the mixture obtained in (d), for at least 1 hour, at room temperature; (f) heating the mixture obtained in (d) or in (e) to a temperature of between 60° C. to 100° C., for at least 2 hrs, thus allowing the formation of the dendripolyamide PGA; and (g) optionally, isolating the dendripolyamide PGA obtained in (f).

In accordance to this process, the polyamine-polyamide oligomer may be obtained by (i) preparing fatty acid monomers by methanolysis of bean oil; (ii) oligomerizing the monomers obtained in (i) in the presence of sebacic acid and activated aluminum oxide, thus obtaining predominantly dimers thereof; (iii) polycondensing the oligomer obtained in step (ii) with from about 5% to about 20% excess of triethylenetetramine to obtained a polyamide-polyamine oligomer; (iv) further reacting the polyamide-polyamine oligomer obtained in step (iii) with bis(4-oxyphenyl)sulphone diglycidy ether dissolved in 2-propanol to obtain the desired polyamine-polyamide oligomer.

According to a further embodiment of the invention, dendripolyamide IDA may be prepared. Thus, the process will comprise the steps of:- (a) dissolving a mole of a diamide obtained by reacting isophoronediamine and a suitable fatty acid dimer, and 4 moles of diglycidyl aniline in 2-propanol and mixing the same; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of a 4-functional polyepoxy adduct; (d) mixing about 4 moles of a polyamine-polyamide oligomer, dissolved in 1-methyl-2-pyrrolidinone, with a mole of the 4-functional polyepoxy adduct obtained in (c); (e) optionally further mixing the mixture obtained in (d), for at least 1 hour, at room temperature; (f) heating the mixture obtained in (d) or in (e) to a temperature of between 60° C. to 1 00° C., for at least 2 hrs, thus allowing the formation of the dendripolyamide IDA; and (g) optionally, isolating the highly branched dendripolyamide IDA obtained in (f)

The polyamine-polyamide oligomers according to this embodiment of the invention may be obtained by (i) preparing fatty acid monomers by methanolysis of sunflower oil; (ii) oligomerizing the monomers obtained in (i) in the presence of terephthalic acid and activated aluminum oxide, thus obtaining predominantly dimers thereof; (iii) polycondensing the oligomer obtained in step (ii) with from about 5% to about 20% excess of triethylenetetramine to obtained a polyamide-polyamine oligomer; (iv) further reacting the polyamide-polyamine oligomer obtained in step (iii) with 1,6-hexanediol diglycidyl ether dissolved in 1-methyl-2-pyrrolidinone to give the desired oligomer.

Finally, the process according to the invention may be employed for the preparation of to dendripolyamide ABA which process comprises the steps of:- (a) dissolving a mole of 4-aminobenzylamine with 4 moles of 1,l-dimethyl-2,4-diglycidyl hydantoin in ethanol and mixing the same; (b) optionally further mixing the solution obtained in (a) for at least 30 min, at room temperature; (c) heating the mixture obtained in (a) or in (b) to a temperature of from 50° C. to 80° C., for at least 1 hour, thus allowing the formation of a 4-functional polyepoxy adduct; (d) mixing about 4 moles of polyamine-polyamide oligomer dissolved in butyl alcohol, with a mole of the 4-functional polyepoxy adduct obtained in (c), which polyamine-polyamide oligomer was obtained by reacting the commercially available HY825 polyamide with a diglycidyl ether of α-hexafluoro-bisphenol A, dissolved in ethanol; (e) optionally further mixing the mixture obtained in (d), for at least 1 hour, at room temperature; (f) heating the mixture obtained in (d) or in (e) to a temperature of between 60° C. to 100° C., for at least 2 hrs, thus allowing the formation of the dendripolyamide ABA; and (g) optionally isolating the dendripolyamide ABA obtained in step (f).

As will be demonstrated in the following examples, the dendripolyamides of the present invention, and in particular those prepared by the disclosed process, demonstrate high adhesion to various substrates, are fast-grasping, can be cured at room temperature, have good mechanical properties and an ability to withstand impact loading, all of which are essential features in the field of, inter alia, epoxy industry.

Finally, the invention relates to the different uses of the branched oligomers of the invention in several applications, such as in the preparation of epoxy hardener mixtures, as a wet strong additives, as a hot-melt adhesives, in the preparation of printing inks, as a softening agents in rubbers, as a flocculation agents or in any other suitable application.

The invention will now be described in an illustrative manner and it is to be understood that the terminology which will be used is intended to be in the nature of the words of description rather than of limitation.

Obviously, many modifications and variations of the present invention are possible in light of the above teaching, and it is therefore to be understood that within the scope of the appended claims, the invention may be practiced otherwise than as specifically described.

EXAMPLES

In the following Examples, the oligomers (dendripolyamides) were employed as hardeners of epoxy compounds in either lacquer, glue, enamel or sealant mixtures. However, these Examples are only for illustrating the efficiency of the dendripolyamides of the invention to function as hardeners of the epoxy mixture. It should be clear to the man of the art that the disclosed dendripolyamides may be used for any other suitable purpose as hereinbefore detailed and shall not be restricted to the disclosed uses only.

Example 1

Dendripolyamide E

1(I) Preparation of fatty acid monomers by methanolysis of bean oil

Methanolysis of bean oil was obtained by mixing bean oil (1767 gr, 2 mole) having an acid number of 1.3 and a saponification value of 190.1, with 1500 ml methanol (CAS No. 67-56-1) and with potassium hydroxide (20 gr, CAS No. 1310-58-3). The reaction was carried out in a three-necked reactor (5000 ml) equipped with an inner spiral condenser, and an outer jacket covering, wherein the reactor was connected to a reflux condenser, a dropping funnel (2000 ml) and a mechanical stirrer. The reaction mixture, while being continuously stirred, was heated to the boiling temperature of the mixture, and refluxed at that temperature, for 6 hrs. Then, upon the dropwise addition of acetic acid (21.5 gr) through the dropping funnel, the reaction mixture was neutralized, after which, the reflux condenser was replaced with a standard condenser, for distillation of the residual methanol, at 90° C.–95° C.

After removal of the methanol from the reaction mixture, the system was cooled to a temperature of 40° C., resulting in the formation of two separate layers of glycerin and oil, from which the glycerin layer was removed thoroughly. From the oily layer, the volatile components (e.g. residual methanol, water, acetic acid) were removed by vacuum distillation (125° C.–130° C., 10–12 mmHg). The distillation process continued until, visually, no more condensation occurred.

The oily product obtained, (1760 gr, theoretical yield of 99.1%) having a saponification value of 192.2, was composed of a mixture of monomers of methyl acid esters.

1(II) Oligomerization of fatty acid monomers in the presence of adipic acid

Oligomerization of the monomers obtained in Example 1(I) (1760 gr) was performed in the presence of adipic acid (65 gr, CAS No. 124-04-9) and activated aluminum oxide (130 gr, CAS No. 1344-28-1). The reaction was carried out in a three-necked reactor (2500 ml), equipped with an inner spiral condenser, and an outer jacket covering, the reactor being further connected to a reflux condenser, a thermometer and a mechanical stirrer. The reaction was conducted under reflux conditions, at a temperature of 280° C., with continuous stirring. The progress of the reaction was monitored by measuring the change of the refraction coefficient of the mixture. After approximately 12 hrs, the temperature of the system was raised to 300° C., until the refraction coefficient of the mixture reached 1.4807 (for an additional period of 8 hrs). The mixture was then cooled to 80° C.–90° C., and the remainder of the aluminum oxide was filtered, yielding a yellowish product (1810 gr, theoretical yield 99.2%), which may be represented by the following general formula:

$$H_3COC(O)(C_{29.8}H_{55.2})(C(O)OCH_3)_{0.75}.$$

In addition, the product may be characterized by the following chemical and physical parameters:

| | |
|---|---|
| Average molecular weight (gr/mole) | 516.0 |
| Monomers (%) | 46.4 |
| Dimers (%) | 34.3 |
| Trimers (%) | 18.7 |
| Polymers (%) | 0.6 |
| Acid number | 19.1 |
| Saponification value | 190.7 |

1(III) Synthesis of polyamide-polyamine resin

The polyamide-polyamine resin was prepared by polycondensation of the dimer containing product obtained in Example 1(II), with a suitable amine. Accordingly, the above described product (1810 gr) having 6.15 gr-equivalents of carboxyl groups, and tetra-ethylenepentamine (1280 gr, 10% w/w excess, CAS No. 112-57-2), were mixed in a four-necked reactor (5000 ml), equipped with an inner spiral condenser, and an outer jacket covering, the reactor being connected to a thermometer, a mechanical stirrer, a dropping funnel and a column, the latter being connected, through an adaptor, to a condenser, which at its other end was connected to a collecting flask.

The reaction mixture was heated to 120° C., under continuously stirring, resulting in the evaporation and condensation, in the collecting flask, of the side product, methanol. To ensure the complete removal of the methanol, the temperature of the system was elevated to 180° C., after which the remainder of any volatile components present in the reaction mixture and the excess of the amine, were removed by vacuum distillation (125° C.–130° C., 8–10 mmHg). A viscous, brownish colored, polyamide resin (2757 gr, theoretical yield 99.3%) was obtained.

The product may be represents by the following general formula:

$$H_2N-(CH_2CH_2NH)_4CO(C_{29.8}H_{55.2})[COHN-(CH_2CH_2NH)_4-H]_{0.75}$$

In addition, The product may be characterized by the following parameters:

| | |
|---|---|
| Density, at 25° C. (gr/cm³) | 0.982 |
| Viscosity, at 25° C. (mPa.s) | 16,600 |
| Amine value (mgKOH/gr) | 495.7 |
| Primary amino groups (%) | 3.10 |
| Secondary amino groups (%) | 9.30 |
| H-equivalent weight (gr) | 90 |
| Gel time with epoxy (Epon 828) (min) | 150 |

The product was diluted for further processing, with ethyl alcohol, wherein the final concentration of ethyl alcohol in the solution was 20%.

1(IV Synthesis of a four-branched ethylenediamine-epoxy adduct

A four-branched adduct of ethylenediamine and epoxy was prepared by mixing diglycidyl ether of Bisphenol A (1190 gr, 3.482 mole, technical grade, CAS No. 25036-25-3) with ethyl acetate (590 ml, CAS No. 141-78-6), after which ethylenediamine (56.8 gr, 0.87 mole, CAS No. 107-15-3) was added. The reaction was carried out in a three-necked reactor (2500 ml), equipped with an inner spiral condenser and an outer jacket covering, the reactor being connected to a condenser, a dropping funnel (200 ml) and a mechanical stirrer. The components of the reaction were mixed for 2 hrs, at room temperature. Then, the temperature of the system was raised to 50° C., and the system was maintained at this temperature for additional 30–40 min, resulting in the formation of a glycerin like product (1773 gr).

The product obtained may be represented by the general formula (I), wherein m is equal to 1; R and R¹ are identical and represent the group:

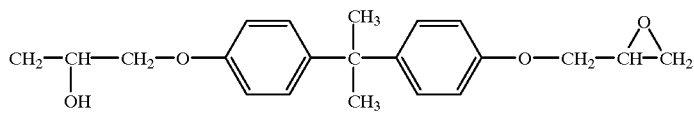

and R² represents a 1,2-ethylene group.

In addition, the product may be characterized by the following parameters:

| | |
|---|---|
| Density, at 25° C., (gr/cm³) | 1.01 |
| Viscosity, at 25° C., (mPa.s) | 180 |
| Epoxy groups (%) | 12.1 |
| MW (based on % epoxy groups) (gr/mole) | 1237.4 |
| MW (based on stoichiometric ratio between reactants) (gr/mole) | 1242.2 |

1(V) Synthesis of dendripolyamide E

Dendripolyamide E was prepared by mixing, at room temperature, the polyamide resin (3442 gr, 4.34 mole), obtained by the reaction described in Example 1(III) (after being diluted with 20% (w/w) of ethyl alcohol) with a freshly prepared ethylenediamine-epoxy four-branched adduct (1837 gr, 0.87 mole), obtained by the method as described in Example 1(IV). The reaction was carried out in a four necked reactor (7500 ml), covered with an outer jacket covering, and equipped with a mechanical stirrer, a condenser and a dropping funnel (2000 ml), for 3 hrs. Then, the temperature of the reaction mixture was raised to its boiling temperature and the mixture was maintained at this temperature, for additional 3 hrs. After cooling, dendripolyamide E (5273 gr, theoretical yield of 99.9%) was transferred, while being in its liquid form, into a storing vessel.

The product, consisting of 76.6% dendripolyamide E, may be represented by general formula (I), wherein m is equal to 1, R and R¹ are the same and represent the group of general formula (II) in which p and u are equal to 1, n is equal to 0.75;

R³ represents the group 2,2'-bis(4-oxyphenyl)propylene of the formula:

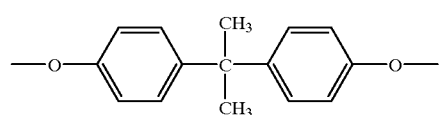

R⁴ and R⁶ are the same and represent the group
—(CH₂CH₂NH)₃—CH₂CH₂—;

R⁵ represent the group (C₂₉.₈H₅₅.₂); and $R^2$ represent 1,2-ethylene.

In addition, the product may be characterized by the following parameters:

| | |
|---|---|
| MW (gr/mole) | 4,592 |
| Density, at 25° C. (gr/cm$^3$) | 0.958 |
| Viscosity, at 25° C. (mPa.s) | 23,600 |
| Amine value (mgKOH/gr) | 477.0 |
| H-equivalent weight (gr) | 192.7 |
| Gel time with epoxy (Epon 828) (min) | 160 |

1 (VI) Evaluation of dendripolyamide E

In order to determine the quality of the dendripolyamide E obtained, for example, as a hardener additive in epoxy resins, several mixtures containing either the dendripolyamide E or a commercially available, closely related polyamide, with a suitable epoxy mixture, were prepared. The content of the Epoxy mixture is shown in Table 1(A), wherein the amount shown for each component is expressed as a percentage of the total weight of the mixture. The contents of the dendripolyamide or the commercially available polyamide mixtures are shown in Table 1(B), wherein the amount of each component is expressed as its percentage of the total weight of the epoxy mixture.

TABLE 1(A)

Epoxy mixture components

| | % of Total Weight (A) |
|---|---|
| Epon 828 (EW 195, 4 gr) | 70 |
| Epon 1004 (EW 1,000) | 30 |
| TOTAL | 100 |

TABLE 1(B)

Oligomer mixture components

| | Mixture No. (% of total weight of A) | | |
|---|---|---|---|
| | 1 | 2 | 3 |
| Dendripolyamide E | 96.8 | — | — |
| Linear polyamine-polyamide | — | 45.4 | — |
| Versamide 125 | — | — | 74.6 |
| Nonyl-Phenol | 38.0 | 13.4 | 22.4 |
| Ethyl acetate + Ethyl alcohol (1:1 v/v) | 176.0 | 100.0 | 130.0 |

Each mixture was then applied as a lacquer, onto one side of either a steel, an aluminum or a wood plate (100 mm$^2$), and kept at room temperature. After 24 hrs, each coated plate was heated to 60° C., and kept at this temperature for additional 3 hrs.

For each coating, several physical parameters were determined. The results for each system are depicted in Table 2:

TABLE 2

Physical characteristics of the different final mixtures

| | Mixture No. | | |
|---|---|---|---|
| | 1 | 2 | 3 |
| Gel time, at room temperature (min) | 70 | 90 | 90 |
| Resistance to direct impact (kg) | ≦50 | ≦40 | ≦40 |

TABLE 2-continued

Physical characteristics of the different final mixtures

| | Mixture No. | | |
|---|---|---|---|
| | 1 | 2 | 3 |
| Resistance to indirect impact (kg) | ≦50 | ≦35 | ≦30 |
| Hardness, Shore scleroscope, scale D | 85 | 80 | 80 |
| Resistance to pencil scratch | | | |
| Room temperature | >2H | >2H | >2H |
| 50° C. | >2H | >2H | >2H |
| 70° C. | 2H | H | H |
| 90° C. | H | B | B |
| Water absorption | 0.18% | 0.38% | 0.35% |
| Corrosion[a] | n.o[b] | n.o | n.o |

[a]corrosion underneath the dendripolyamide E composition coating
[b]none observed These results indicate that while the activities of the mixtures, as determined by their gel time, and the stability of the coatings with respect to different types of impacts (resistance to direct impact, resistance to scratching at room temperature, hardness, and corrosion parameters), were similar, the flexibility of the mixture containing the dendripolyamide E (mixture 1) was higher. In addition, at elevated temperatures, mixture 1, had a greater resistance to scratching, which may infer a greater thermal stability thereof. Furthermore, the results show that mixture 1 absorbed less water, which evidently is a preferred feature in the field of hardeners of epoxy resins. These results also indicate that dendripolyamide E may be utilized also in the preparation of sealant materials, which usually require thermally stable components, such as for sealing between bricks or building blocks.

Example 2

Dendripolyamide H

2(I) Oligomerization of fatty acid monomers in the presence of sebacic acid

Fatty acid monomers were prepared by methanolysis of bean oil, in the manner as described in Example 1(I). Then, the monomers were oligomerized in the presence of activated aluminum oxide (160 gr) and sebacic acid (80 gr, CAS No. 111-20-6). The oligomerization reaction was carried out in the manner described in Example 1(II). The product obtained was distilled under vacuum conditions (220° C.–250° C., 10 mmHg).

Products of several repeated experiments were combined and the collected fraction (1845 gr, theoretical yield of 38.3% compared to the oxide), contained 1.7% of the acid esters monomers, 89.6% dimers and 8.7% of a trimer of the acid esters.

The product may be characterized by the following parameters:

| | |
|---|---|
| Density, at 25° C. (gr/cm$^3$) | 0.930 |
| Viscosity, at 25° C. (mPa.s) | 3560 |
| Average MW (gr/mole) | 609.7 |
| Amine value (mgKOH/gr) | 192.5 |

The dimer, which is the preferred product of the reaction, may be represented by the general formula:

2(II) Synthesis of a polyamide-polyamine resin

A polyamide-polyamine resin was prepared by polymerizing the product obtained in Example 2(II) (1413.2 gr thereof), with triethylene tetramine (842.1 gr, 20% excess, CAS No. 112-24-3). The reaction was carried out in the manner as described in Example 1(III) yielding the requested polyamide-polyamine resin.

The resin may be represented by the following general formula:

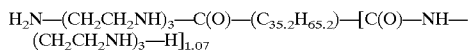

H$_2$N—(CH$_2$CH$_2$NH)$_3$—C(O)—(C$_{35.2}$H$_{65.2}$)—[C(O)—NH—(CH$_2$CH$_2$NH)$_3$—H]$_{1.07}$

In addition, the resin may be characterized by the following parameters:

| | |
|---|---|
| Density, at 25° C. (gr/cm$^3$) | 0.980 |
| Viscosity, at 25° C. (mpa.s) | 19,800 |
| Amine value (mgKOH/gr) | 410.3 |
| Primary amino groups (%) | 3.45 |
| Secondary amino groups (%) | 6.83 |
| H-equivalent weight (gr) | 100 |
| Gel time with epoxy (Epon 828) (min) | 180 |

2(III) Synthesis of a six-branched hexamethylenediamine-epoxy adduct

A six-branched adduct of hexamethylenediamine and epoxy was prepared by reacting an epoxy resin, Epon 834 (1113.8 gr, MW 483 gr/mole, 2.3 mole, CAS No. 124-09-4), with 1,4-dioxane (295 gr, CAS No. 123-91-1), and with a 1:1 mixture of 2-propanol [CAS No. 67-63-0] and hexamethylenediamine (67.0 gr, 0.576 mole, CAS No. 124-09-4). The reaction was carried out in the manner as described in Example 1(IV), thus providing an unstable, hexamethylenediamine-epoxy adduct (1475.8 gr), which may be represented by the general formula (I), wherein m is equal to 1, R and R are the same and represent the group:

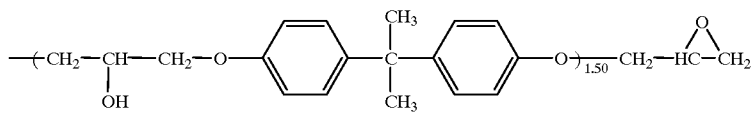

and R$^2$ represents a 1,6-hexylene group.
In addition, the product may be characterized by the following parameters:

| | |
|---|---|
| Density, at 25° C. (gr/cm$^3$) | 1.08 |
| Viscosity, at 25° C. (mPa.s) | 210 |
| Epoxy groups (%) | 8.32 |
| MW (based on % epoxy groups) (gr/mole) | 2067.3 |
| MW (based on stoichiometric ratio between reactants) (gr/mole) | 2048.4 |

2(IV) Synthesis of dendripolyamide H

Dendripolyamide H was prepared by reacting the adduct obtained in Example 2(III) (1475.8 gr, 0.576 mole) with the polyamide-polyamine resin obtained in Example 2(II) (1950 gr, 2.306 mole), in the presence of ethanol (480 gr). The reaction was carried out in the manner as described in Example 1(V). The resulting mixture contained 80.1% of the dendripolyamide product.

The product may be represented by general formula (I), wherein m is equal to 1, R and R$^1$ are the same and represent the group of general formula (II), in which p is equal to 1, u is equal to 1.5 and n is equal to 1.07;

R$^3$ represents 2,2'-bis(4-oxyphenyl)propylene;

R$^4$ and R$^6$ are the same and represent the group —(CH$_2$CH$_2$NH)$_2$—CH$_2$CH$_2$—

R$^5$ represents the average group —(C$_{35.2}$H$_{65.2}$)—; and

R$^2$ represents a 1,6-hexylene.

In addition, the product may be characterized by the following parameters:

| | |
|---|---|
| Density, at 25° C. (gr/cm$^3$) | 0.953 |
| Viscosity, at 25° C. (mPa.s) | 26,850 |
| Amine value (mgKOH/gr) | 319.7 |
| U-equivalent weight (gr) | 252.8 |
| Gel time with epoxy (Epon 828) (min) | 160 |

2(V) Evaluation of dendripolyamide H

In order to determine the quality of dendripolyamide H obtained to function as a hardener, in particular of epoxy resins, several mixtures containing dendripolyamide H or standard, commercially available polyamides, and a suitable epoxy mixture, were prepared. The epoxy mixture is shown in Table 3(A) wherein the amount of each component is expressed as a percentage of the total weight of the mixture. The epoxy mixture was then mixed with a polyamide mixture, the composition of which is expressed, in Table 3(B), as a percentage of the total weight of the epoxy mixture.

In the epoxy mixture, an adduct of xylylenediamine (CAS No. 539-48-0) and poly(propylene glycol) diglycidyl ether (MW 640 gr/mole) were employed. Such an adduct was prepared by reacting these components according to conventional methods. In the reaction, the ratio between the reactants was 2.2:1.0, respectively.

TABLE 3(A)

Epoxy Mixture Components (Part A)

| | % of Total Weight |
|---|---|
| Epon 834 (MW 483 gr/mole) | 72.73 |
| Poly (propyleneglycol) diglycidyl ether[a] | 18.18 |
| Dioctyl phathalate[b] | 9.09 |
| TOTAL | 100.0 |

[a]MW 483 gr/mole, CAS No. 26142-30-3
[b]CAS No. 117-81-7

TABLE 3(B)

Oligomer Mixture Components (Part B)

| | Mixture No. | | |
|---|---|---|---|
| | 4 | 5 | 6 |
| Dendripolyamide H | 102.8 | — | — |
| Linear polyamine-polyamide | — | 43.4 | — |
| Versamide 140 | — | — | 61.2 |
| Amino adduct[c] | 20.6 | 108 | 15.5 |
| 2,4,6-Tris(dimethylaminomethyl)phenol | 6.0 | 6.0 | 6.0 |

[c]CAS No. 90-72-2

The mixtures were evaluated for their quality as glues. Accordingly, each mixture was applied onto one side of an aluminum plate (100 mm 25.4 mm 1.6 mm) and exposed to air, at room temperature, for a period of 3–5 min. Then, each two corresponding plates were paired and held together, at room temperature, for 20 hrs, to allow for at least 75%–80% of the curing to occur. To ensure complete curing, the paired plates were heated to 60° C., and kept at this temperature for 4 hrs.

In addition, a number of plates coated with each of the mixtures were left exposed to air for the same time period.

Several parameters were determined for each mixture. The results are shown in Table 4.

TABLE 4

Physical Characteristics of the Different Final Mixtures

| | Mixture No. | | |
|---|---|---|---|
| | 4 | 5 | 6 |
| Gel time (min., 25 C) | 30 | 30 | 35 |
| Resistance to pencil scratch | 2H | 2H | 2H |
| Hardness, Shore scleroscope, scale D | 85 | 82 | 78 |
| Shear strength at | | | |
| −20° C. | 131 | 64 | 53 |
| 20° C. | 140 | 148 | 124 |
| 50° C. | 165 | 142 | 148 |
| 80° C. | 120 | 104 | 90 |

These results indicate that the compositions, when applied onto plates, as a glue, exhibited different properties. The activity (gel time), the resistance to an impact or hardness (determined by Shore scleroscope or by its shear strength at room temperature) of the mixtures, did not significantly differ. However, when the same parameters were tested at extreme temperatures, i.e. −20° and up to 80° C., the mixture comprising dendripolyamide H (mixture No. 4), exhibited a greater shear strength, inferring its greater thermal stability compared to glues prepared from commercially available polyamides.

Example 3

Dendripolyamide C

3(I) Preparation of fatty acid monomers by methanolysis of sunflower oil

Methanolysis of sunflower oil was obtained by mixing sunflower oil (1750.6 gr, 2.0 mole) with methanol (1500 ml) and KOH (20 gr). The reaction was carried out in the manner described in Example 1(I). Monomers (1754.6 gr theoretical yield of 99.8%) of methyl ester acids were obtained.

3(II) Oligomerization of fatty acid monomers in the presence of terephthalic acid Oligomerization of the monomers obtained in Example 3(I) in the presence of terephthalic acid (60 gr, CAS No. 100-21-0) and of an activated aluminum oxide (120 gr) was performed in the manner as described in Example 1 (II).

The product obtained (1751 gr, theoretical yield of 99.8%) was then distilled, under vacuum conditions (220–250° C., 10 mmHg). Products of several repeated experiments were combined and the collected fraction consisted of 2.7% monomers, 89.3% dimers and 8.0% trimers of the acid esters.

The product obtained may be characterized by the following general formula:

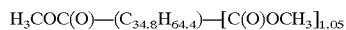

In addition, the following parameters were determined:

| Average molecular weight (gr/mole) | 603.5 |
|---|---|
| Density (gr/cm³) | 0.935 |
| Viscosity (mPa.s) | 2960 |
| Saponification Value (mgKOH/gr) | 190.5 |

3(III) Synthesis of polyamide-polyamine resin

A polyamide-polyamine resin was prepared by reacting the product obtained in Example 3(II) (1641.5 gr), consisting of 5.58 gr equivalents of carboxyl groups, with triethylene-tetramine (897.4 gr, 10% w/w excess), in the manner as described in Example 1(III). As a result, 2238.9 gr of a resin (theoretical yield 98.3%) were obtained.

The product may be characterized by the following general formula:

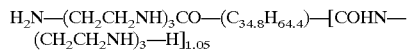

In addition, the product may be characterized by the following parameters:

| Density, at 25° C. (gr/cm³) | 0.982 |
|---|---|
| Viscosity, at 25° C. (mPa.s) | 10,300 |
| Amine value (mgKOH/gr) | 412.5 |
| Primary amino groups (%) | 3.40 |
| Secondary amino groups (%) | 6.92 |
| H-equivalent weight (gr) | 102 |
| Gel time with epoxy (Epon 828) (min) | 160 |

3(IV) Synthesis of an N-Cyclohexyl-1,3-propanediamine-epoxy adduct

A three branched adduct of N-Cyclohexyl-1,3-propanediamine and epoxy resin was prepared by reacting N-Cyclohexyl-1,3-propanediamine (65.0 gr, 0.415 mole, CAS No. 3312-60-5) with Epon 1004 (2626.6 gr, MW 2108 gr/mole, 1.246 mole, CAS No. 25036-25-3) and butyl acetate (1154 gr, CAS No. 123-86-4), in the manner as described in Example 1(IV). As a result, 3845.6 gr of an unstable adduct were obtained.

The adduct may be characterized by general formula (I), wherein m is equal to 1, R represents a cyclohexyl group, $R^1$ represents the group:

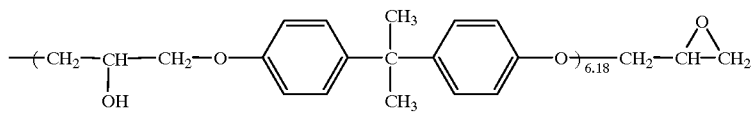

and $R^1$ represents 1,3-propylene.

In addition, the product may be characterized by the following parameters:

| | |
|---|---|
| Density, at 25° C. (gr/cm³) | 1.06 |
| Viscosity, at 25° C. (mPa.s) | 670 |
| Epoxy groups (%) | 2.04 |
| MW (based on % epoxy groups) (gr/mole) | 6323.5 |
| MW (based on stoichiometric ratio between reactants) (gr/mole) | 6480.2 |

3(V) Synthesis of dendripolyamide C

Dendripolyamide C resin was prepared by mixing a freshly prepared adduct obtained in Example 3(IV) (3845.6 gr) with the polyamide-polyamine resin obtained in Example 3(III) (1042.5 gr), which was diluted with 2-propanol (1303.0 gr). The reaction was carried out in the manner as described in Example 1(V). As a result, a liquid product (6091.2 gr, theoretical yield 98.4%) consisting of 62.1% of the dendripolyamide C resin was obtained. In order to enable further processing with the dendripolyamide, the product was diluted with 2-propanol resulting in a mixture containing 75% (w/w) of the dendripolyamide. The dendripolyamide may be represented by general formula (I), wherein m is equal to 1, R represents a cyclohexyl group, $R^1$ represents the group of general formula (II), in which p is equal to 1, n is equal to 1.05 and u is equal to 6.18,
R represents the group 2,2'-bis(4-oxyphenyl)propylene;
$R^4$ and $R^6$ are the same and represent the group —$(CH_2CH_2NH)_2$—$CH_2CH_2$—;
$R^5$ represents —$(C_{34.8}H_{64.4})$—; and
$R^2$ represents 1,3-propylene.

In addition, the product may be characterized by the following parameters:

| | |
|---|---|
| Average MW (gr/mole) | 8,990 |
| Density, at 25° C. (gr/cm³) | 0.937 |
| Viscosity, at 25° C. (mPa.s) | 22,850 |
| Amine value (mgKOH/gr) | 205.1 |
| H-equivalent weight (gr) | 670.2 |
| Gel time with epoxy (Epon 828) (min) | 180 |

3(VI) Evaluation of dendripolyamide C

In order to determine the efficiency in which dendripolyamide C may function as a hardener in epoxy resins, several mixtures comprising either dendripolyamide C, or closely related and commercially available polyamide resins, were prepared. First, an epoxy mixture as shown in Table 5(A), and a dendripolyamide or polyamide mixture, as shown in Table 5(B), were prepared. Then, each amide-containing mixture was mixed with the epoxy mixture, to obtain three different curing mixtures. The content of the epoxy mixture is depicted in the following Table 5(A), wherein the amount shown for each component is expressed as its percentage of the total weight of the mixture. The amounts shown for each component in the polyamide mixtures is expressed as a percentage of the total weight of the epoxy mixture.

TABLE 5(A)

Epoxy Mixture Components

| | % of Total Weight |
|---|---|
| Epoxy resin Epon 1004 (EW 1,000) | 52.36 |
| Dibutyl phthalate (CAS No. 84-74-2) | 7.85 |
| Silica (CAS No. 112945-52-5) | 26.18 |
| Titanium dioxide (CAS No. 1317-70-0) | 3.14 |
| Butyl acetate | 10.47 |
| TOTAL | 100.00 |

TABLE 5(B)

Oligomer Mixture Components

| | Mixture No. (% of epoxy mixture) | | |
|---|---|---|---|
| | 7 | 8 | 9 |
| Dendripolyamide C[a] | 141.2 | — | — |
| linear polyamide-polyamine | — | 14.3 | — |
| Versamide 115 | — | — | 31.0 |
| Resorcinol (CAS No. 108-46-3) | 8.2 | 1.4 | 3.1 |
| Butyl acetate + isopropyl alcohol (1:1) | 3.3 | 84.3 | 65.9 |

[a]as diluted with 2-propanol

Each final mixture of the epoxy and amide mixtures was immediately applied onto either a steel, an aluminum or a wood plate (100 mm²). The coated plates were kept at room temperature, for 24 hrs, after which they were heated to 60° C., and maintained at this temperature for 3 hrs., to ensure curing. A smooth, uniform, white coating was obtained on each plate.

Several criteria were examined in order to evaluate the quality of the resins prepared. The results are depicted in Table 6:

TABLE 6

Physical Characteristics of the Different Final Mixtures

| | Mixture No. | | |
|---|---|---|---|
| | 7 | 8 | 9 |
| Viscosity[a] | 480 | 280 | 320 |
| Gel time (min.), at room temperature | 80 | 90 | 70 |
| Resistance to direct impact (kg m) | 50 | 40 | 50 |
| Resistance to indirect impact (kg m) | 50 | 30 | 40 |
| Type of destruction after indirect impact[b] | n.v | v | v |
| Hardness, Shore scleroscope, scale D | 90 | 85 | 85 |
| Resistance to pencil scratch | | | |
| Room temperature | >2H | >2H | >2H |
| 50° C. | >2H | H | 2H |
| 70° C. | 2H | HB | H |
| 90° C. | H | B | B |

TABLE 6-continued

Physical Characteristics of the Different Final Mixtures

|  | Mixture No. | | |
|---|---|---|---|
|  | 7 | 8 | 9 |
| Water absorption | 0.10 | 0.18 | 0.15 |
| Corrosion (steel plates) | n.v | n.v | n.v |

[a] viscosity of the final mixture at room temperature, before application;
[b] n.v. not visible, v.d visible.

The results indicate that the final mixtures, applied onto the plates as enamels, differ in their properties, with superiority to the mixture containing the dendripolyamide C (mixture No. 7). While, at room temperature, the activity of the three resins (gel time), their resistance to direct impact and their hardness (shore scleroscope or resistance to pencil scratch) were similar, at elevated temperatures, mixture No. 7 exhibited better properties, as indicated by its greater resistance to pencil scratch, at 50, 70 and 90° C. Such mixtures can then be employed as enamels in applications which require resistance to heat, such as ovens. In addition, mixture No. 7 absorbed less water than the other enamel coatings which, evidently, is an essential feature, independent from the type of application the hardener is used.

Example 4

Dendripolyamide I

4(I) Synthesis of fatty acid monomers by methanolysis of castor oil

Methanolysis of castor oil was obtained by mixing the same (1846.0 gr, 2.0 mole) with methanol (1500 ml) and KOH (20 gr). The reaction was carried out in the manner described in Example 1 (I), and resulted in the formation of methylated fatty acid monomers (1825.8 gr, theoretical yield 98.9%).

4(II) Oligomerization of fatty acid monomers in the presence of salicylic acid

Oligomerization of the monomers obtained in Example 4(I) in the presence of salicylic acid (60 gr, CAS No. 69-72-7) and activated aluminum oxide (120 gr) was carried out in the manner described in Example 1 (II).

The product obtained (1882 gr, theoretical yield 99.8%) was then distilled under vacuum conditions (120–200° C., 10 mmHg) to remove the residual monomers.

Products of several repeated experiments were combined. The final product consisted of 2.3% monomers, 51.5% dimers, 45.3% trimers and 0.9% tetramers of the acid.

The product may be characterized by the following parameters:

| Average MW (gr/mole) | 725.0 |
|---|---|
| Density, at 25° C. (gr/cm³) | 0.948 |
| Viscosity, at 25° C. (mPa.s) | 6,250 |
| Saponification value (mgKOH/gr) | 189.2 |

The dimer product obtained, which is also the preferred product, may be represented by the following general formula:

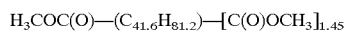

$$H_3COC(O)—(C_{41.6}H_{81.2})—[C(O)OCH_3]_{1.45}$$

4(III) Synthesis of polyamide-polyamine resin

A polyamide-polyamine resin was prepared from the product obtained in Example 4(II), by reacting the same (1750 gr, contesting of 5.9 gr equivalent of carboxyl groups) with diethylentriamine (608.9 gr) in the manner described in Example 1(III). As a result, a polyamide-polyamine resin (2124.5 gr, theoretical yield 97.9%) was obtained. The product may be represented by the following general formula:

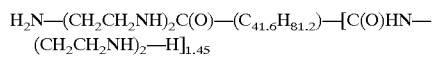

$$H_2N—(CH_2CH_2NH)_2C(O)—(C_{41.6}H_{81.2})—[C(O)HN—(CH_2CH_2NH)_2—H]_{1.45}$$

In addition, the following parameters were obtained:

| Density, at 25° C. (gr/cm³) | 0.990 |
|---|---|
| Viscosity, at 25° C. (mPa.s) | 28,800 |
| Amine value (mgKOH/gr) | 309.0 |
| Primary amino groups (%) | 3.82 |
| Secondary amino groups (%) | 3.82 |
| H-equivalent weight (gr) | 122.3 |
| Gel time with epoxy (Epon 828) (min) | 170 |

4(IV) Synthesis of 1-(5-amino-1,3,3-trimethylcyclohexane) methylamine-epoxy adduct.

A four-branched adduct of epoxy resin with 1-(5-amino-1,3,3-trimethylcyclohexane) methylamine (isophoronediamine, CAS No. 2855-13-2) was prepared by reacting isophoronediamine (83.4 gr, 0.489 mole) with Epon 828 (767.6 gr, 1.958 mole, CAS No. 25036-25-3) and butyl ether (213 gr, CAS No. 142-96-1). The reaction mixture was kept at room temperatures for 2 hrs, whilst stirring, followed by heating to 60° C. and maintaining at this temperature for 3 hrs. As a result, an unstable adduct (1064.0 gr), was obtained.

The general formula of the adduct may be represented by general formula (I), wherein m is equal to 1, R and R¹ are the same and represent the group:

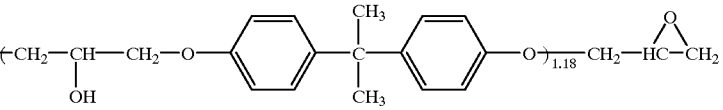

and R² represents the group:

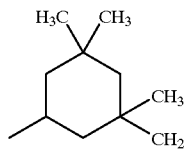

In addition, the product may be characterized by the following parameters:

| | |
|---|---|
| Density, at 25° C. (gr/cm³) | 1.06 |
| Viscosity, at 25° C. (mPa.s) | 550 |
| Epoxy group (%) | 10.1 |
| MW (based on epoxy group %) (gr/mole) | 1703.0 |
| MW (based on stoichiometric ratio between reactants) (gr/mole) | 1738.4 |

4(V) Synthesis of dendripolyamide I

Dendripolyamide I was prepared by reacting the adduct solution obtained in Example 4(IV) (1064.0 gr, 0.489 mole) with the polyamide-polyamine resin obtained in Example 4(III) (1760.0 gr, 1.96 mole), which was diluted in 2-propanol (440 gr). The reaction was carried out in the manner described in Example 1(V).

The resulting product (3222.6 gr, theoretical yield 98.7%), which comprised 80.0% of the dendripolyamide compound, may be represented by general formula (I), wherein m is equal to 1, R and $R^1$ are the same and represent the group of general formula (II) in which p is equal to 1, n is equal to 1.45 and u is equal to 1.18;
$R^3$ represents 2,2'-bis(4-oxyphenyl)propylene;
$R^4$ and $R^6$ are the same and represent
—$CH_2CH_2NHCH_2CH_2$—;
$R^5$ represents —$(C_{41.6}H_{81.2})$—; and
$R^5$ is the (1,3,3-trimethylcyclohex-5-yl)methylene, as defined in Example 4(IV).

In addition, the following parameters were determined for the product:

| | |
|---|---|
| Average molecular weight (gr/mole) | 5,334 |
| Density (gr/cm³) | 0.932 |
| Viscosity (mPa.s) | 16,050 |
| Amine value (mgKOH/gr) | 283.5 |
| H-equivalent weight (gr) | 262.5 |
| Gel time with epoxy (Epon 828) (min) | 150 |

4(VI) Evaluation of dendripolyamide I

In order to determine the nature of dendripolyamide I as a hardener, and in particular with epoxy resins, several mixtures containing either dendripolyamide I, or standard polyamides closely related in their structures to the dendripolyamide, with a suitable epoxy mixture, were prepared. The compositions of the mixtures are shown in Tables 7(B) and 7(B), wherein the amounts shown for each component in the epoxy mixture is expressed as its percentage of the total weight of the mixture whereas the amount of each component shown in Table 7(B) is expressed as a percentage of the total weight of the epoxy mixture.

TABLE 7(A)

Epoxy Mixture Components

| | % of Total Weight |
|---|---|
| Epoxy-thiokol resin (ELP 812) | 57.1 |
| Butyl glycidyl ether | 5.1 |
| Silica | 4.3 |
| Iron black oxide[a] | 2.9 |
| TOTAL | 100.0 |

The epoxy-Thiokol resin (ELP 812) employed was prepared by reacting an epoxy resin, Epon 828, with Thiokol LP-3, in a molar ratio of 1:1. The reaction was carried out according to conventional methods to result in the formation of a resin having a molecular weight of 1290 gr/mole.

TABLE 7(B)

Oligomer Mixture Components

| | Mixture No. (% of epoxy mixture) | | |
|---|---|---|---|
| | 10 | 11 | 12 |
| Dendripolyamide I | 18.4 | — | — |
| linear polyamine-polyamide | — | 12.8 | — |
| Versamide 125 | — | — | 12.4 |
| (Diethylene triaminomethyl)phenol[b] | 4.6 | 3.2 | 3.5 |

[a]CAS No. 1317-61-9
[b]technical grade

The epoxy and polyamide mixtures were then mixed together and applied onto a surface of roughened aluminum plates (101 mm×25.4mm×1.6 mm). Following a brief exposure to air (3–5 min, at room temperature), each two plates were paired together by affixing the coated surfaces to each other and were so held together for 20 hrs, at room temperature, to allow for curing of the resin between the plates to begin. To complete the curing reaction, the assembled plates were heated for 4 hrs, at 60° C.

In addition to the above, several single plates, coated with each of the mixtures, were left exposed to air, for the same time period.

The parameters depicted in Table 8 were obtained for each final mixture:

TABLE 8

Physical Characteristics of the Different Final Mixtures

| | Mixture No. | | |
|---|---|---|---|
| | 10 | 11 | 12 |
| Gel time (min), at room temperature | 35 | 30 | 35 |
| Hardness, Shore scleroscope, scale D | 78 | 82 | 75 |
| Resistance to pencil scratch | 2H | 2H | 2H |
| Shear strength at | | | |
| −20° C. | 123 | 81 | 65 |
| 20° C. | 198 | 173 | 188 |
| 50° C. | 177 | 130 | 124 |
| 80° C. | 155 | 90 | 92 |

The results show that at room temperature, the three mixtures exhibit a similar gel time, hardness and shear strength. Nevertheless, when tested at less moderate temperatures, i.e. −20° C. and up to 80° C., the mixture containing dendripolyamide I (mixture No. 10) exhibited a greater shear strength. Evidently, obtaining either a sealant, a lacquer or any other epoxy mixtures, which is stable at extreme temperatures is a primary goal in the epoxy industry. Thus, the dendripolyamides of the present application are clearly a breakthrough in the field.

Example 5

Dendripolyamide T

5(I) Synthesis of a triethylene tetramine-epoxy adduct

A six-branched adduct of triethylenetetramine and epoxy compound was prepared by reacting poly(propylene glycol) diglycidyl ether (1373.0 gr, 3.6 mole, MW 381.4 gr/mole, CAS No. 26142-30-3) with triethylenetetramine (87.7 gr, 0.6 mole, CAS No. 112-24-3) and ethyl acetate (158 gr, CAS No. 141-78-6), in the manner described in Example 1(IV). The resulting adduct (1618.7 gr) may be represented by general formula (I), wherein m is equal to 3, R and $R^1$ are the same and represent the group:

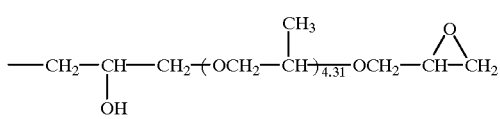

$R^2$ represents a 1,2-ethylene.

The following parameters were determined which may characterize the product:

| | |
|---|---:|
| Density, at 25° C. (gr/cm³) | 1.03 |
| Viscosity, at 25° C. (mPa.s) | 1540 |
| Epoxy group (%) | 10.7 |
| MW (based on epoxy group %) (gr/mole) | 2411.2 |
| MW (based on stoichiometric ratio between reactants) (gr/mole) | 2434.6 |

5(II) Synthesis of dendripolyamide T

Dendripolyamide T resin was prepared by mixing the adduct obtained in Example 5(I) (1618.7 gr) with a commercially available polyamide resin, Versamide 140 (4428.0 gr, 3.6 mole; average MW 1230 gr/mole) which was diluted in 2-propanol (1107.0 gr). The reaction was carried out in the manner described in Example 1(V). As a result, a solution, containing 82.4% of the dendripolyamide T resin (7060.7 gr, theoretical yield 98.7%) was obtained.

The product may be represented by general formula (I), wherein m is equal to 3, R and $R^1$ are the same and represent the group of general formula (II), in which p is equal to 1.6, n is equal to 1 and u is equal to 4.31;

R represents 1,3-dioxyisopropylene of the formula —O—CH$_2$—CH(CH$_3$)—O—;

$R^4$ and $R^6$ are the same and represent —(CH$_2$CH$_2$NH)$_2$—CH$_2$CH$_2$—;

$R^5$ represents the average group —(C$_{34.0}$H$_{66.4}$)—; and

R is 1,2-ethylene.

In addition, the product may be characterized by the following parameters:

| | |
|---|---:|
| Average MW (gr/mole) | 9,815 |
| Density, at 25° C. (gr/cm³) | 0.933 |
| Viscosity, at 25° C. (mPa.s) | 30,650 |
| Amine value (mgKOH/gr) | 285.3 |
| H-equivalent weight (gr) | 215.7 |
| Gel time with epoxy (Epon 828) | 180.0 |

Example 6

Dendripolyamide MP

6(I) Synthesis of a meta-phenylenediamine-epoxy adduct

A four-branched adduct of 1,3-phenylenediamine and an epoxy compound was prepared by reacting resorcinol diglycidyl ether (642.0 gr, 2.8 mole, MW 229.3, technical grade) with 1,3-phenylenediamine (75.7 gr, 0.7 mole, CAS No. 108-45-2) and dioxane (308 gr, CAS No. 123-91-1), in the manner described in Example 1(IV). The resulting adduct obtained (1025.7 gr), may be represented by general formula (I), wherein m is equal to 1, R and $R^1$ are the same and represent the group:

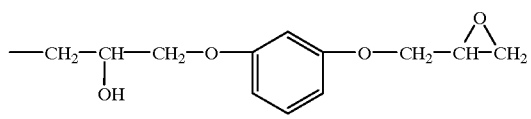

and $R^2$ is 1,3-phenylene.

In addition, the product may be characterized by the following parameters:

| | |
|---|---:|
| Density, at 25° C. (gr/cm³) | 1.05 |
| Viscosity, at 25° C. (mPa.s) | 1060 |
| Epoxy group (%) | 16.9 |
| MW (based on epoxy group %) (gr/mole) | 1017.8 |
| MW (based on stoichiometric ratio between reactants) (gr/mole) | 1025.4 |

6(II) Synthesis of dendripolyamide MP

Dendripolyamide MP resin was synthesized by reacting a solution containing the adduct obtained in Example 6(I) (1025.7 gr, 0.7 mole) with the polyamide resin Versamide 125 (4368.0 gr, 2.8 mole, average MW 1560 gr/mole) which was diluted in dioxane (1092 gr). The reaction was carried out in the same manner as described in Example 1(VI). The resulting product (6455.1 gr, theoretical yield 99.5%), containing 79.8% dendripolyamide MP, may be represented by general formula (I), wherein m is equal to 1, R and $R^1$ are the same and represent the group of general formula (II) in which p is equal to 2.14, n and u are equal to 1;

$R^3$ represents 1,3-dioxyphenylene of the formula:

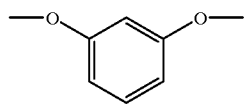

$R^4$ and $R^6$ are the same and represent —(CH$_2$CH$_2$NH)$_3$—CH$_2$CH$_2$—;

$R^5$ represents (C$_{34.0}$H$_{66.4}$)—; and $R^2$ represents 1,3-phenylene.

In addition, the product may be characterized by the following parameters:

| | |
|---|---:|
| Average MW (gr/mole) | 7363 |
| Density, at 25° C. (gr/cm³) | 0.943 |
| Viscosity, at 25° C. (mPa.s) | 33,750 |
| Amine Value (mgKOH/gr) | 253.4 |
| H-equivalent weight (gr) | 248.7 |
| Gel time with epoxy (Epon 828) (min) | 180 |

6(III) Evaluation of dendripolyamide MP

In order to evaluate the nature of dendripolyamides T and MP as a hardener and especially of epoxy resins, mixtures of the dendripolyamide, or commercially available polyamides, with a suitable epoxy mixture, were prepared. The epoxy and polyamide mixtures are shown in Tables 9(A) and 9(B), respectively, wherein the amount shown for each component in the epoxy mixture is expressed as its percentage of the total weight of the mixture, whereas the amount for each component in the polyamide mixture is expressed as a percentage of the total weight of the epoxy mixture.

TABLE 9(A)

Epoxy Mixture Components

| | % of Total Weight |
|---|---|
| Epoxy-thiokol resin (ELP 812) | 55.6 |
| o-Cresyl Glycidyl Ether[a] | 8.3 |
| Silica | 33.3 |
| Iron red oxide | 2.8 |
| TOTAL | 100 |

TABLE 9(B)

Oligomer Mixture Components

| | Mixture No. (% of epoxy mixture) | | |
|---|---|---|---|
| | 13 | 14 | 15 |
| Dendripolyamide T | 25.0 | — | — |
| Dendripolyamide MP | — | 24.0 | — |
| Versamide 140 (CAS No. 2210-79-9) | — | — | 15.0 |
| N,N-Dimethylbenzylamine | 5.0 | 4.8 | 4.0gr |

Each polyamide mixture was then mixed with the epoxy mixture, to obtain final mixtures, each of which was applied onto a surface of a roughened aluminum plates (101 mm×25.4 mm×1.6 mm) and exposed to air for 3–5 min, at room temperature. Each two plates were then paired together by bringing the coated surfaces into contact, and the paired plates were held together for 20 hrs, at room temperature, to allow for curing of the resin between the plates to begin. To complete the curing process, the paired plates were heated to 60° C. and were maintained at this temperature for 4 hrs.

In addition, several individual coated plates were held exposed to air for 20 hrs, after which they were also heated to 60° C. and maintained at this temperature for 4 hrs.

The parameters depicted in Table 10, were obtained for each coated plate:

TABLE 10

Physical Characteristics of the Different Final Mixtures

| | Mixture No. | | |
|---|---|---|---|
| | 13 | 14 | 15 |
| Gel time (min), 25° C. | 30 | 30 | 40 |
| Glass transition temperature (° C.) | −2.0 | −10.0 | +12.4 |
| Hardness, Shore scleroscope, scale D | 85 | 83 | 76 |

TABLE 10-continued

Physical Characteristics of the Different Final Mixtures

| | Mixture No. | | |
|---|---|---|---|
| | 13 | 14 | 15 |
| Shear strength at | | | |
| −20° C. | 108 | 111 | 69 |
| 20° C. | 205 | 190 | 173 |
| 50° C. | 184 | 172 | 117 |
| 80° C. | 151 | 150 | 96 |

The mixtures applied onto the plates were evaluated for their quality as glues or lacquers. The results indicate that while at room temperature the gel time, i.e. the activity, as well as the hardness and shear strength of the different mixtures, are similar, at less moderate temperatures, the mixtures containing the dendripolyamide T and dendripolyamide MP (Mixtures Nos. 13 and 14, respectively), exhibited greater shear strength and a lower glass transition temperature. It is evident that such low glass transition temperatures, which infer the thermal resistance and flexibility of the cured material at low temperatures, are beneficial and ensure the integrity of objects, such as aircraft, at low temperatures. Evidently, these results, and in particular the shear strength parameters, indicate that the cured materials containing the dendripolyamides of the present application, may also be utilized as excellent epoxy glues.

Example 7

Dendripolyamide TP

7(I) Synthesis of polyamide trimers

Trimers of the polyamide-polyamine resins were prepared from the polyamide resin obtained in Example 1(III), by first placing the polyamine-polyamide resin (1776 gr) in a four necked reactor (5000 ml), equipped with an inner spiral condenser, and an outer jacket covering, the reactor being connected to a condenser for distillation, a dropping funnel (1000 ml), a thermometer and a mechanical stirrer. The condenser was connected at its other end to a collecting flask. The reaction system was heated at 100° C., with continuous stirring. To the melt, sebacic acid (202.3 gr, 1.0 mole) was added and dissolved, after which the temperature of the system was raised to 120° C., thereby allowing water thus formed to evaporate and condense into the collecting flask. To ensure removal of the water, the temperature was further raised to 180° C., until the condensation into the collecting flask ended.

Products of several repeated reactions were combined, to yield a brownish solid resin (5786.1 gr, theoretical yield 99.3%) comprised of trimers of the polyamide-polyamine resin.

The product may be represented by the following general formula:

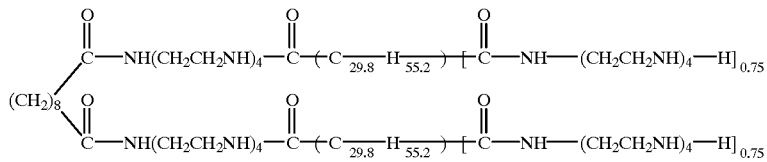

In addition, the product may be characterized by the following parameters:

| | |
|---|---|
| Density, at 25° C. (gr/cm³) | 0.989 |
| Softening point (° C.) | 67.0 |
| Amine value (mgKOH/gr) | 346.0 |
| Primary amino groups (%) | 1.08 |
| Secondary amino groups (%) | 7.62 |
| H-equivalent weight (gr) | 144.0 |

7(II) Synthesis of a tetraethylenepentamine-epoxy adduct

A six-branched adduct of tetraethylenepentamine and an epoxy compound was synthesized by reacting 1,4-butanediol diglycidyl ether (519.4 gr, 2.45 mole, CAS No. 2425-79-8) with tetraethylenepentamine (66.2 gr, 0.35 mole, CAS No. 112-57-2) dissolved in ethyl acetate (140.4 gr). The reaction was carried out in the manner described in Example 1(IV).

As a result, an unstable adduct (726.1 gr) was obtained which may be represented by general formula (I), wherein m is equal to 4, R and $R^1$ are the same and represent the group:

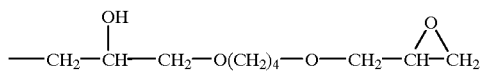

and $R^2$ represents 1,2-ethylene.

In addition, the product may be characterized by the following parameters:

| | |
|---|---|
| Density, at 25° C. (gr/cm³) | 1.03 |
| Viscosity, at 25° C. (mPa.s) | 2,130 |
| Epoxy group (%) | 18.6 |
| MW (based on epoxy group %) (gr/mole) | 1618.3 |
| MW (based on stoichiometric ratio between reactants) (gr/mole) | 1673.3 |

7(III) Synthesis of dendripolyamide TP

Dendripolyamide TP was prepared by reacting the adduct obtained in Example 7(11) (726.0 gr) with the polyamide-polyamine resin obtained in Example 7(I) (4758.6 gr, 2.45 mole), diluted with isopropyl alcohol (1120 gr). The reaction was carried out in the manner described in Example 1(VI), to yield a dendripolyamide TP (6565.0 gr, theoretical yield 99.4%) which may be represented by general formula (I), wherein m is equal to 4, R and $R^1$ are the same and represent the group of general formula (II) in which p and u are equal to 1 and n is equal to 0.5;

$R^3$ represents 1,4-dioxybutylene;

$R^4$ represents the group of general formula (VIIIa), as herein before described, in which D represents 1,8-dioxyoctylene (—O—$(CH_2)_8$—O—);

$R^5$ represents —$(C_{29.8}H_{55.2})$—;

$R^6$ represents —$(CH_2CH_2NH)_2$—$CH_2CH_2$—; and $R^2$ represents an 1,2-ethylene.

The product, containing 80.0% of the dendripolyamide TP, may be characterized by the following parameters:

| | |
|---|---|
| Average MW (gr/mole) | 15,200 |
| Density, at 25° C. (gr/cm³) | 0.937 |
| Viscosity at 25° C. (mPa.s) | 34,200 |
| Amine value (mgKOH/gr) | 396.0 |
| H-equivalent weight (gr) | 218.1 |
| Gel time with epoxy (Epon 828) (min) | 160 |

Example 8

Dendripolyamide X

8(I) Synthesis of polyamide trimers

A trimer of the polyamide-polyamine resin obtained in Example 2(111) was prepared, by first placing said polyamide-polyamine resin (1691.4 gr, 2.0 mole) and methyltetrahydrophthalic anhydride (166.2 gr) in a four-necked reactor (2500 ml), equipped with an inner spiral condenser, and an outer jacket covering, the reactor being connected to a mechanical stirrer, a thermometer and a column, the latter being connected, through an adaptor, to a condenser, for simple distillation with a collecting flask. The reaction was carried out in the manner described in Example 7(I). Products of three repeated experiments were combined to yield a brownish coloured solid resin (5508 gr, theoretical yield 99.8%).

The trimeric product may be represented by the following general formula:

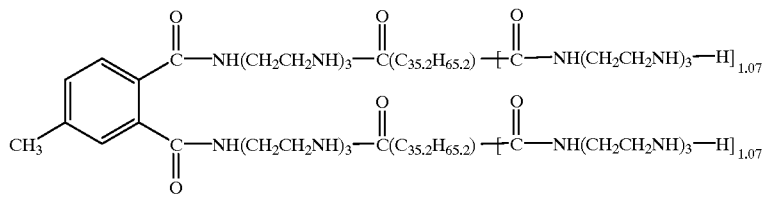

In addition, the product may be characterized by the following parameters:

| | |
|---|---|
| Density, at 25° C. (gr/cm³) | 0.983 |
| Softening point (° C.) | 56 |
| Amine Value (mgKOH/gr) | 317.2 |
| Primary amino groups (%) | 1.54 |
| Secondary amino groups (%) | 6.45 |
| H-equivalent weight (gr) | 148 |

8(II) Synthesis of a xylyenediamine-epoxy adduct

Synthesis of a four-branched adduct of xylylenediamine and epoxy was obtained by reacting 1,1-dioxymethyl cyclohexene 4-diglycidyl ether (481.8 gr, 2.0 mole (Epoxy resin)), xylylenediamine (68.1 gr, 0.5 mole) and benzyl alcohol (183.3 gr). The reaction was carried out in the manner described in Example 1(IV). The adduct obtained (733.2 gr) may be represented by general formula (I), wherein m is equal to 1, R and RI are the same and represent the group:

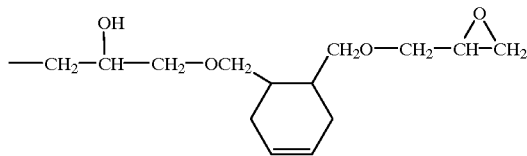

and $R^2$ represents 1,4-xylylene.

In addition, the product may be represented by the following parameters:

| | |
|---|---:|
| Density, at 25° C. (gr/cm³) | 1.08 |
| Viscosity, at 25° C. (mPa.s) | 430 |
| Epoxy group (%) | 15.3 |
| MW (based on epoxy group %) (gr/mole) | 1124.2 |
| MW (based on stoichiometric ratio between reactants) (gr/mole) | 1099.8 |

8(III) Synthesis of dendripolyamide X

Dendripolyamide X was prepared in the manner described in Example 1(V), by reacting the adduct obtained in Example 8(11) (733.2 gr) and the trimeric polyamide obtained in Example 8(I) (3679.2 gr, 2.0 mole) which was diluted in tetrahydrofuran (1226.4 gr). A product (5605.0 gr, theoretical yield 99.4%), containing 75.1% of the dendripolyamide was obtained. The dendripolyamide X may be represented by general formula (I), wherein m is equal to 1, R and $R^1$ are the same and represent the group of general formula (II), in which p and u are equal to 1, n is equal to 1.14;

$R^3$ represents 1,1-[bis(oxymethyl)]cyclohex-3-enylene;

$R^4$ represents the group of general formula (VIIIa) in which D is 1,2-(3-methyl)cyclohex-3-enylene;

$R^5$ represents $(C_{35.2}H_{65.2})$—;

$R^6$ represents —$(CH_2CH_2NH)_2$—$CH_2CH_2$—; and $R^2$ is a 1,4-xylylene.

In addition, the product may be characterized by the following parameters:

| | |
|---|---:|
| Average MW (gr/mole) | 8,458 |
| Density, at 25° C. (gr/cm³) | 0.949 |
| Viscosity (mPa.s) | 19,300 |
| Amine value (mgKOH/gr) | 309.6 |
| Equivalent weight (gr) | 303.4 |
| Gel time with epoxy (Epon 828) (min) | 150 |

Example 9

Dendripolyamide CD

8(I) Synthesis of polyamide trimers

Polyamide trimers were prepared by reacting a commercially available polyamide resin, Hardener 825 (2760.0 gr, 2.0 mole, Hardener 825, Ciba-Geigy, Switzerland) and 5-norbornene-2,3-dicarboxylic acid anhydride (164.2 gr, 1 mole, CAS No. 826-62-0), in the manner described in Example 7(I). Products of two repeated experiments were combined. The resulting product (5771.6 gr, theoretical yield 99.3%), which was a brownish-coloured solid resin, may be represented by the following general formula:

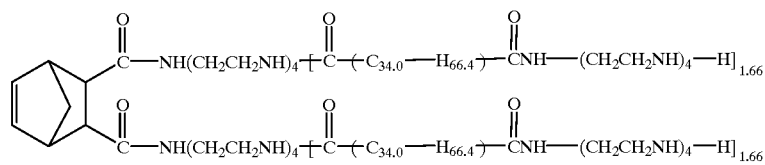

The product may be characterized by the following parameters:

| | |
|---|---:|
| Density, at 25° C. (gr/cm³) | 0.986 |
| Softening point (° C.) | 73 |
| Amine value (mgKOH/gr) | 346.1 |
| Primary amino groups (%) | 1.04 |
| Secondary amino groups (%) | 7.61 |
| H-equivalent weight (gr) | 145.6 |

9(II) Synthesis of a 1,4-diaminocyclohexane-epoxy adduct

A four-branched adduct of 1,4-cyclohexanediamine and an epoxy compounds was prepared by reacting 3,3',5,5'-tetrabromobisphenol A diglycidyl ether (917.8 gr, 1.4 mole, MW 655.6 gr/mole, technical grade) dissolved in butyl acetate (280 gr), with 1,4-diamino-cyclohexene (40.0 gr, 0.35 mole, CAS No. 2651-25-0), dissolved in ethyl alcohol (40.0 gr). The resulting, unstable intermediate product (1277.8 gr) may be represented by general formula (I), wherein m is equal to 1, R and $R^1$ are the same and represent the group:

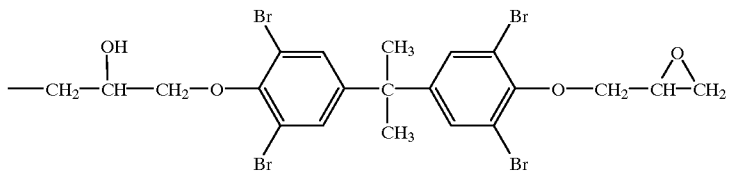

and $R^2$ is 1,4-cyclohexylene.

In addition, the product may be characterized by the following parameters:

| | |
|---|---|
| Density, at 25° C. (gr/cm³) | 1.12 |
| Viscosity, at 25° C. (mPa.s) | 3260 |
| Epoxy group (%) | 6.1 |
| MW (based on epoxy group %) (gr/mole) | 2736.6 |
| MW (based on stoichiometric ratio between reactants) (gr/mole) | 2819.7 |

9(III) Synthesis of dendripolyamide CD

Dendripolyamide CD was prepared by reacting a freshly prepared intermediate adduct (1277.8 gr), obtained as described in Example 9(II), with the polyamide trimers (4068.7 gr, 2.0 mole) obtained as described in Example 9(I), which was diluted in ethyl alcohol (1356.3 gr). The reaction was carried out in the manner described in Example 1(V). The resulting dendripolyamide product (6662.6 gr, theoretical yield 99.4%), consisting of 76.2% of the dendripolyamide, may be represented by the general formula (I), wherein by the general formula (I), wherein m is equal to 1, R and $R^1$ are the same and represent the group of general formula (II), in which p is equal to 1.66, n and u are equal to 1;

$R^3$ represents the group 2,2-[bis(3,5-dibromo-4-oxyphenyl)]propylene;

$R^4$ represents the group of general formula (VIIIa) in which D the group of the formula:

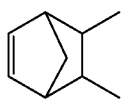

(1,2-bicyclo[2.2.1]hept-2-enylene);

$R^5$ represents the average group —$(C_{34.0}H_{66.4})$—;

$R^6$ represents —$(CH_2CH_2NH)_3$—$CH_2CH_2$—; and $R^2$ is 1,4-cyclohexylene.

In addition, the product may be represented by the following parameters:

| | |
|---|---|
| Average MW (gr/mole) | 14,361 |
| Density, at 25° C. (gr/cm³) | 1.09 |
| Viscosity, at 25° C. (mPa.s) | 27,600 |
| Amine value (mgKOH/gr) | 187.0 |
| H-equivalent weight (gr) | 145 |
| Gel time with epoxy (Epon 828) (min) | 200 |

Example 10
Dendripolyamides TP, X and CD
10(I) Synthesis of a flexible epoxy resin First, a polyester of diethylene glycol and sebacic acid, having carboxy groups at its terminals was prepared by reacting diethylene glycol (848.8 gr, 8 mole) and sebacic acid (1820.7 gr, 9 mole). The polyester was then condensed with an epoxy resin, Epon 828 (molar ratio 1:4, respectively). The epoxidic product obtained, had a viscosity of 47.6 Pa.s and an average EW of 655 gr.

10(II) Evaluation of Dendripolyamides TP, X and CD

Dendripolyamides TP, X, and CD, prepared as described in Examples 7, 8 and 9, respectively, were tested in order to evaluated their nature as hardeners of epoxy resins. Several mixtures, containing these dendripolyamides or a commercially available polyamide resin (hardener HY 825, Ciba-Geigy, Switzerland) were prepared, after which they were mixed with a suitable epoxy mixture comprising the flexible epoxy resin obtained in Example 10(I) (48.5 gr), poly (epichlorohydrin) diglycidyl ether (12.1 gr, EW 182.2 gr, density 1.138 gr/cm3, viscosity 280 mPa.s), calcium carbonate (18.2 gr, CAS No. 471-34 -1), silica (18.2 gr) and titanium dioxide (3.0 gr, CAS No. 1317-80-2). The epoxy mixture was then mixed with each of the polyamides, to obtain the final mixtures depicted in Table 11. The amounts shown for each component in the Table, is expressed as a percentage of the weight of the epoxy mixture (100%).

TABLE 11

Oligomer Mixture Components

| | Mixture No (% of total weight of epoxy mixture) | | | |
|---|---|---|---|---|
| | 16 | 17 | 18 | 19 |
| Epoxy mixture | 100 | 100 | 100 | 100 |
| Dendripolyamide TP[a] | 15.6 | — | — | — |
| Dendripolyamide X[a] | — | 17.0 | — | — |
| Dendripolyamide CD[a] | — | — | 19.1 | — |
| Hardener (HY 828)[b] | — | — | — | 13.7 |
| Salicylic acid | 1.2 | 1.2 | 1.2 | 1.2 |

[a]The dendripolymer and the hardener were mixed before the addition of other components.
[b]Ciba-Geigy, Switzerland The mixtures were then poured into silicone molds, and allowed to cure for 6 hrs, at room temperature, after which the blocks obtained (blocks of 8 mm×4 mm×60 mm) were heated for additional 3 hrs, at 80° C., to complete the curing process. The resulting blocks had no visible defects.

For each mixture, the following parameters, as presented in Table 12, were determined:

TABLE 12

Physical Characteristics of the Different Final Mixtures

| | Mixture No. | | | |
|---|---|---|---|---|
| | 16 | 17 | 18 | 19 |
| Density (gr/cm³) of cured mixture | 1.17 | 1.14 | 1.19 | 1.19 |
| Tensile strength (MPa) | 40.6 | 41.3 | 39.8 | 35.7 |
| Tensile elongation (%) | 72.5 | 804 | 713 | 56.0 |
| Impact strength (kJ/m²) | 42.1 | 55.2 | 47.4 | 29.5 |

TABLE 12-continued

Physical Characteristics of the Different Final Mixtures

|  | Mixture No. | | | |
|---|---|---|---|---|
|  | 16 | 17 | 18 | 19 |
| Hardness, Shore scleroscope, scale A | 88 | 77 | 88 | 90 |
| Hardness, Shore scleroscope, scale D | 75 | 53 | 63 | 52 |
| Glass transition temperature (° C.) | −2 | −14 | −8 | +4 |
| Water absorption (%) | 0.25 | 0.30 | 0.28 | 0.28 |

In addition, the plastic blocks composed of dendripolyamides TP, X and CD were subjected to a flexural strength test. A compressive stress test resulted in the flattening of the blocks, without formation of any fractures in their structure.

These results, and in particular, the tensile strength, the tensile elongation, the impact strength and the glass transition temperature of the cured mixtures, infer the flexibility and durability of the dendripolyamides. Such features are essential when using the same as sealant materials.

Example 11

Dendripolyamide PGA

11(I) Synthesis of linear polyamide-epoxy adduct

A linear polyamide-epoxy adduct was synthesized by reacting the polyamide-polyamine resin (1861.4 gr, 2.2 mole) prepared as described in Example 2(III), and diluted with 2-propanol (200 gr), with bis(4-oxyphenyl)sulphone diglycidyl ether (362.3 gr, 1 mole, MW 362.3 gr/mole), diluted with ethyl acetate (47.0 gr).

The polyamide-polyamine resin was placed in a four-necked reactor (3000 ml) equipped with an inner spiral condenser and an outer jacket, a mechanical stirrer, a reflux condenser, a thermometer and a dropping funnel. The diluted bis(4-oxyphenyl)sulphone diglycidyl ether was added through the dropping funnel to the polyamide-polyamine solution, whilst continuously stirring the latter. After 3 hrs of stirring at room temperature, the temperature was raised to 60° C. and the reaction mixture was maintained at this temperature for additional 2 hrs.

Products of two repeated reactions were combined to yield a brownish-coloured, viscous liquid (4939.6 gr, theoretical yield 99.8%), which may be represented by the following general formula:

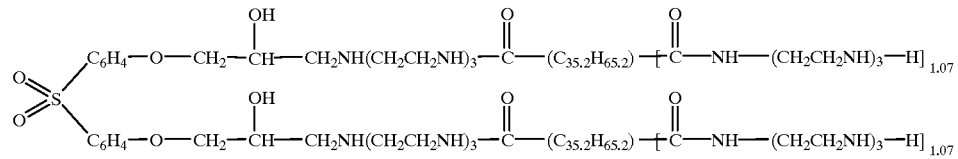

In addition, the product may be characterized by the following parameters:

| Density, at 25° C. (gr/cm³) | 0.980 |
|---|---|
| Viscosity, at 25° C. (mPa.s) | 18,460 |
| Amine value (mgKOH/gr) | 356.4 |
| Primary amino groups (%) | 1.40 |
| Secondary amino groups (%) | 7.09 |
| H-equivalent weight (gr) | 148.0 |

11 (II) Synthesis of poly(oxypropylene)diamine-epoxy adduct

A four-branched adduct of poly(propylene glycol)bis(2-aminopropyl)ether and an epoxy compound was prepared by reacting diglycidyl 2,4,6-tribromoaniline (914.8 gr, 2.0 mole, MW 457.4 gr/mole, technical grade) with poly(propylene glycol)bis(2-aminopropyl)ether (200.0 gr, 0.5 mole, MW 400 gr/mole, CAS No. 9046-10-0) in the presence of butyl acetate (278.7 gr). The reaction was carried out in the manner described in Example 1(IV). The adduct obtained (1393.5 gr) may be represented by the general formula (I), wherein m is equal to 1, R and $R^1$ are the same and represent the group:

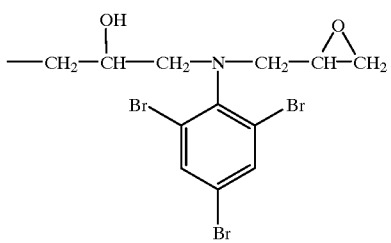

and $R^2$ represent the group:

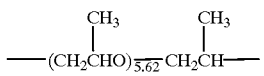

In addition, the product may be characterized by the following parameters:

| Density, at 25° C. (gr/cm³) | 1.09 |
|---|---|
| Viscosity, at 25° C. (mPa.s) | 1,880 |
| Epoxy groups (%) | 7.6 |
| MW (based on % epoxy groups) (gr/mole) | 2263.2 |
| MW (based on stoichiometric ratio between reactants) (gr/mole) | 2229.6 |

11 (III) Synthesis of dendripolyamide PGA

Dendripolyamide PGA was prepared by reacting a freshly prepared linear polyamide-epoxy adduct obtained as described in Example 11(I) (4525.8 gr, 2.0 mole), diluted with ethyl alcohol (1018.3 gr), with the adduct prepared as described in Example 1 1(I) (1393.5 gr). The reaction was carried out in the manner described in Example 1(V).

The product obtained (6893.9 gr, theoretical yield 99.4%), contained 74.7% of the dendripolyamide PGA, which may be represented by general formula (I), wherein m is equal to 1, R and $R^1$ are the same and represent the group of general formula (II), in which p and u are equal to 1 and n is equal to 1.14;

$R^3$ represents N,N-(2,4,6-tribromoaniline);

$R^4$ represents the group of general formula (VIIIb) in which D represents bis(4-oxyphenyl)sulfonylene;

$R^5$ represents the group —$(C_{35.2}H_{65.2})$—;

$R^6$ represents the polyamine group —$(CH_2CH_2NH)_2$—$CH_2CH_2$—; and

R is an polyisopropylene glycol, as defined in Example 11(I).

In addition, the product may be characterized by the following parameters:

obtained as described in Example 3(II) (603.5, 1.0 mole). The reaction was carried out in the manner described in Example 1(III).

The diamide obtained (885.5 gr, theoretical yield 99.6%), may be represented by the following formula which is included in the general formula (XII), as hereinbefore defined:

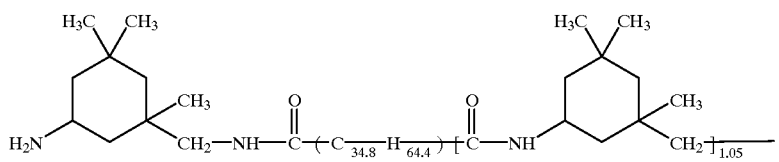

In addition, the product may be characterized by the following parameters:

| Average MW (gr/mole) | 10,448 |
|---|---|
| Density, at 25° C. (gr/cm³) | 1.06 |
| Viscosity, at 25° C. (mPa.s) | 29,800 |
| Amine value (mgKOH/gr) | 370.3 |
| H-equivalent weight (gr) | 257.5 |
| Gel time with epoxy (Epon 828) | 170 |

| Density, at 25° C. (gr/cm³) | 0.987 |
|---|---|
| Softening point (° C.) | 52 |
| Amine value (mgKOH/gr) | 130.0 |
| Primary amino groups (%) | 3.23 |
| Secondary amino groups (%) | 0.00 |
| H-equivalent weight (gr) | 223.8 |

Example 12
Dendripolyamide IDA
12(I) Synthesis of linear polyamide-epoxy adduct A linear polyamide-epoxy adduct was prepared by the dropwise addition through a dropping funnel of 1,6-hexanediol diglycidyl ether (189.2 gr 0.8 mole) to the polyamide-polyamine obtained by Example 3(III) (1673.2 gr, 2.0 mole) previously diluted with 1-methyl-2-pyrrolidinone (410.8 gr), whilst continuously stirring. The reaction was carried in the manner described in Example 11(I).

The product (2261.8 gr, theoretical yield 99.5), containing the linear adduct, may be represented by the following general formula:

12(III) Synthesis of an adduct of isophoronediamine bisamide epoxy

A four-branched adduct of isophoronediamine bisamide was prepared by reacting diglycidyl aniline compound (457.4 gr, MW 228.7, technical grade) with the diamide prepared as described in Example 12(I) (458.9, 0.5 mole), diluted with 2-propanol (230 gr). The reaction was carried out in the manner described in Example 1(IV).

The intermediate, unstable adduct obtained (1146.3 gr), may be represented by the general formula (I), wherein m is

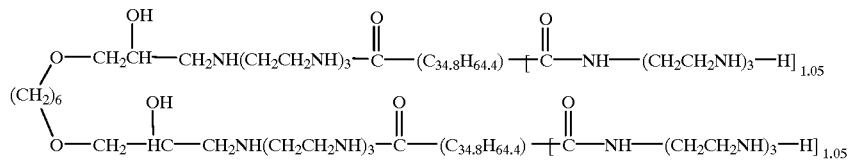

In addition, the product may be characterized by the following parameters:

| Density, at 25° C. (gr/cm³) | 1.080 |
|---|---|
| Viscosity, at 25° C. (mPa.s) | 15,350 |
| Amine value (mgKOH/gr) | 153.4 |
| Primary amino groups (%) | 1.87 |
| Secondary amino groups (%) | 7.38 |
| H-equivalent weight (gr) | 153.4 |

12(II) Synthesis of the core diamide

A diamide, which will be used as the core of the dendripolyamide, was prepared by reacting isophoronediamine (351.2 gr, 2.05 mole) with the fatty acid dimer equal to 1, R and $R^1$ are the same and represent the following N-(2-hydroxypropylene)glycidyl aniline:

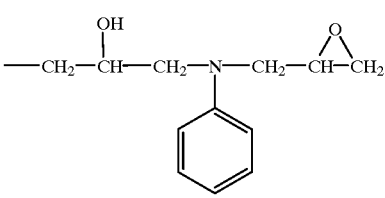

and $R^2$ represent the group:

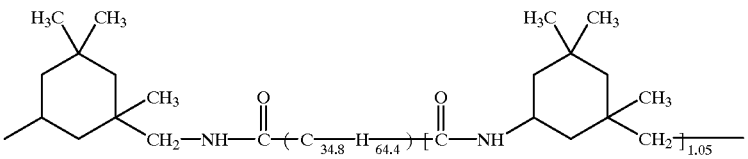

In addition, the following parameters were determined for the product:

| | |
|---|---:|
| Density, at 25° C. (gr/cm$^3$) | 1.05 |
| Viscosity, at 25° C. (mPa.s) | 950 |
| Epoxy group (%) | 9.6 |
| MW (based on epoxy group %) (gr/mole) | 1836.4 |
| MW (based on stoichiometric ratio between reactants) (gr/mole) | 1832.6 |

12(IV) Synthesis of dendripolyamide IDA

A dendripolyamide IDA was prepared by reacting the product obtained in Example 12(III) (1146.3 gr) and the polyamide-epoxy adduct obtained in Example 12(I) (3937.5 gr, 2.0 mole), diluted in ethyl alcohol (1000 gr). The reaction was carried out in the manner described in Example 1(V).

The product obtained (6047.3 gr, theoretical yield 99.4), containing 68.3% of the dendripolyamide IDA, may be represented by general formula (I), wherein m is equal to 1, R and R$^1$ are the same and represent the group of general formula (II), in which p and u are equal to 1, n is equal to 1.05;
R$^3$ represents an N,N-aniline;
R$^4$ represents a group of general formula (VIIIb), in which D is 1,6-dioxyhexylene;
R$^5$ represents —(C$_{34.8}$H$_{64.4}$)—;
R$^6$ represents the polyamine group —(CH$_2$CH$_2$NH)$_2$—CH$_2$CH$_2$—; and
R$^2$ is as defined in Example 12(III)

In addition, the product may be characterized by the following parameters:

| | |
|---|---:|
| Average MW (gr/mole) | 8,183 |
| Density, at 25° C. (gr/cm$^3$) | 0.941 |
| Viscosity, at 25° C. (mPa.s) | 29,950 |
| Amine value (mgKOH/gr) | 530.0 |
| H-equivalent weight (gr) | 215.6 |
| Gel time with epoxy (Epon 828) (min) | 140 |

Example 13
Dendripolyamide ABA
13(I) Synthesis of a linear polyamide-epoxy adduct A linear polyamide-epoxy adduct was prepared by the dropwise addition through a dropping funnel of a diglycidyl ether of α-hexafluoro-bisphenol A (286.1 gr, 0.7 mole; MW 408.7 gr/mole) which was previously diluted with ethanol (567.9 gr), to a solution of a commercially available polyamide resin (1985.5 gr, 1.4 mole; Ciba-Geigy, HY 825, average MW 1418.3 gr/mole), whilst continuously mixing the reaction mixture. The reaction mixture was further stirred for 1 hr, at room temperature, after which the temperature was elevated to 80° C. and the reaction mixture was stirred at this temperature for additional 2 hrs.

The resulting viscous, and brownish liquid obtained, may be represented by the following general formula:

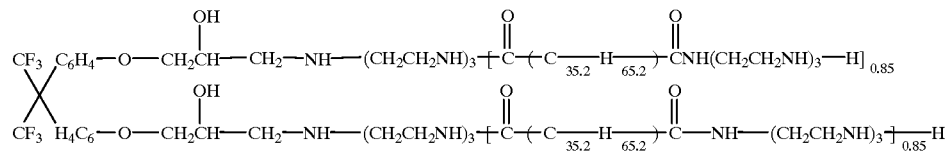

In addition, the product may be characterized by the following parameters:

| | |
|---|---:|
| Density, at 25° C. (gr/cm$^3$) | 1.1 |
| Viscosity, at 25° C. (mPa.s) | 17,800 |
| Amine value (mgKOH/gr) | 150 |
| Primary amino groups (%) | 1.87 |
| Secondary amino groups (%) | 7.58 |
| H-equivalent weight (gr) | 124 |

13(II) Synthesis of a 4-aminobenzylamine-epoxy adduct

A four-branched adduct of 4-aminobenzylamine and an epoxy compound was prepared by reacting 1,1-dimethyl-2,4-diglycidyl hydantoin (322.1 gr, 1.2 mole; MW 268.4 gr/mole) with 4-aminobenzylamine (36.7 gr, 0.3 mole) in the presence of ethanol (63.3 gr). The reaction was carried out in the manner described in Example 1(IV).

The resulting, unstable intermediate product (422.1 gr), contained 78% of the dendripolyamide ABA, which may be represented by general formula (I), wherein m is equal to 1, R and R$^1$ are the same and represent the group:

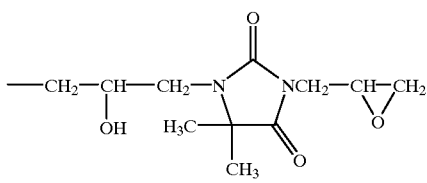

and $R^2$ represents the group:

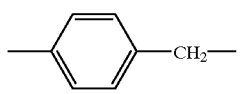

The adduct obtained may be characterized by the following parameters:

| | |
|---|---|
| Density, at 25° C. (gr/cm³) | 1.08 |
| Viscosity, at 25° C. (mPa.s) | 1350 |
| Epoxy groups (%) | 14.6 |
| MW (based on epoxy group %) (gr/mole) | 1,178 |
| MW (based on stoichiometric ratio between reactants) (gr/mole) | 1,196 |

13(III) Synthesis of Dendripolyamide ABA

A dendripolyamide ABA was prepared by reacting the linear epoxy-polyamide adduct in Example 13(I) (4867.7 gr, 1.2 mole), which will function as the core of the dendripolyamide, and the polyamide-epoxy adduct obtained in Example 13(II) (422.1 gr, 0.3 mole), diluted in butyl alcohol (1116.9 gr). The reaction was carried out in the manner described in Example 1(V).

The product obtained (6449.1 gr, theoretical yield 99.1%), containing 78.0% of the dendripolyamide ABA, may be represented by general formula (I), wherein m is equal to 1, R and $R^1$ are the same and represent the group of general formula (II), in which p is equal to 1.7, n and u are equal to 1;

$R^3$ represents N,N'-(5,5-dimethyl)hydantoin;

$R^4$ represents the group of general formula (VIIIb), in which D represents 2,2-[bis(4-oxyphenyl)]-1,1,1,3,3,3-hexafluoropropylene;

$R^5$ represents —$(C_{35.2}H_{65.2})$—;

$R^6$ represents —$(CH_2CH_2NH)_2$—$CH_2CH_2$—; and $R^2$ represents the group of the formula:

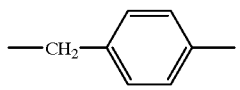

In addition, the product may be characterized by the following parameters:

| | |
|---|---|
| Average MW (gr/mole) | 14,176 |
| Density, at 25° C. (gr/cm³) | 0.935 |
| Viscosity, at 25° C. (mPa.s) | 31,450 |
| Amine value (mgKOH/gr) | 168.1 |
| H-equivalent weight (gr) | 192.6 |
| Gel time with epoxy (Epon 828) (min) | 120 |

Example 14
Evaluation Of The Different Dendripolyamides

Dendripolyamides PGA, IDA and ABA, prepared as described in Examples 11, 12 and 13, respectively, were tested in order to evaluate their properties as hardeners of epoxy resins. Several mixtures, containing each of the dendripolyamides of the invention were mixed with a suitable epoxy mixture, and allowed to cure. The composition of the epoxy mixture is represented in Table 13(A) wherein the amount shown for each component is expressed as its percentage of the total weight of the mixture.

TABLE 13(A)

| Epoxy Mixture Components | |
|---|---|
| | % of Total Weight |
| Epoxy resin (UP-650D) | 15.79 |
| Silica | 15.79 |
| Iron powder | 15.79 |
| Epoxy-urethane (PDI-3A) | 52.63 |
| TOTAL | 100 |

The final mixtures were obtained by adding to the epoxy mixture the amounts of the dendripolyamide shown in Table 13(B), which are expressed as their percentage of the total weight of the epoxy mixture.

TABLE 13(B)

| Oligomer Mixture Components | | | |
|---|---|---|---|
| | Mixture No. | | |
| | 20 | 21 | 22 |
| Dendripolyamide PGA | 18.6 | — | — |
| Dendripolyamide IDA | — | 15.5 | — |
| Dendripolyamide ABA | — | — | 33.1 |
| 2-Oxybenzyldiethylenetriamine | 3.2 | 3.2 | 3.2 |
| 2-Thio-1,3,6,9,12-pentazaunecane[a] | 0.6 | 0.6 | 0.6 |

[a]Condensation product of triethylenetetramine with thiourea, at 100–120° C., ratio 1:1

The epoxy mixture mixed with each of the hardeners, was applied onto one surface of the plates (101cm×25.4cm×1.6cm). After 3 min of exposure to air, the coated surfaces of each two plates were pressed together and allowed to cure, at room temperature, for 20 hr. To ensure curing, the paired plates were then heated to 60° C., and were maintained at this temperature for additional 3 hrs.

The parameters determined for the each mixtures is shown in Table 14:

TABLE 14

| Physical Characteristics of the Different Final Mixtures | | | |
|---|---|---|---|
| | Mixture No. | | |
| | 20 | 21 | 22 |
| Gel time, at 25° C., (min) | 15 | 18 | 15 |
| Glass transition Temperature (° C.) | −15 | −12 | −4 |
| Hardness, Shore scleroscope, scale D | 50 | 53 | 66 |
| Shear strength at | | | |
| −20° C. | 146 | 133 | 112 |
| 20° C. | 155 | 142 | 160 |
| 50° C. | 104 | 109 | 118 |
| 80° C. | 90 | 87 | 91 |

To date, the epoxy-urethane resin was compatible only with some amine hardeners, and with none of the conventional linear polyamides. The surprising finding that the dendripolyamides disclosed herein form homogenous mixtures with the epoxy-urethane resin, and are thus compatible therewith, is clearly a breakthrough in the epoxy industry.

Example 15
The Dendripolyamides As Multifunctional Curing Agents

The dendripolyamides disclosed herein are not restricted to only one application. The following example illustrates that, for example, dendripolyamide H, may be used, depending on the mixture with which it is combined, for different purposes. Thus, the dendripolyamides of the present application, being compatible with different epoxy resin mixtures, are multifunctional.

To an epoxy resin mixture containing the components shown in Table 15(A), a mixture of the dendripolyamide E or C or Versamide 125, with 2,4,6-tris(diethylenetriaminomethyl)phenol (DMP-30) was added. The components of each mixture before combining them together are presented in Tables 15(A) and 15(B). The amounts shown for each component is expressed as a percentage of the total weight of the epoxy mixture.

TABLE 15(A)

Epoxy Mixture Components

|  | (%) of Total Weight (A) |
|---|---|
| Epoxy-Thiokol (ELP 812) | 55.0 |
| Epi-Res 505[a] | 6.8 |
| Aluminum oxide | 18.7 |
| Silica | 16.5 |
| Iron Red Oxide | 3.0 |
| TOTAL | 100 |

[a]Poly(propylene glycol)diglycidyl ether (EW 500 gr)

TABLE 15(B)

| | Mixture No. (% of total weight of epoxy) | | |
|---|---|---|---|
| | 23 | 24 | 25 |
| Dendripolyamide E | 22.8 | — | — |
| Dendripolyamide C | — | 80.0 | — |
| Versamide 125 | — | — | 22.2 |
| DMP-30 | 5.0 | 5.0 | 50 |
| TOTAL | 27.8 | 85.0 | 27.2 |

The final mixtures were then evaluated for their efficacy to function as hardeners in glue compositions. The following parameters were determined:

TABLE 16

Physical Characteristics of the Different Final Mixtures

| | Mixture No. | | |
|---|---|---|---|
| | 23 | 24 | 25 |
| Gel time, at room temperature, (min) | 20 | 20 | 20 |
| Resistance to pencil scratch | 2H | 2H | 2H |
| Hardness, Shore scleroscope, scale D (deg) | 80 | 82 | 78 |
| Shear strength (kg/cm$^2$) | | | |
| −20° C. | 108 | 112 | 60 |
| 20° C. | 206 | 202 | 174 |
| 50° C. | 185 | 193 | 119 |
| 80° C. | 141 | 147 | 85 |
| Peel strength (kg/cm) | 32.0 | 36.1 | 16.3 |
| Glass transition Temperature (° C.) | 75 | 77 | 43 |

These results show that while the gel time and resistance to scratching are similar, mixtures containing the dendripolyamides H or C have greater shore hardness, shear strength, and higher glass transition temperatures, all of which indicate that these dendripolyamides are better hardeners of epoxy resin, for example in glue composition, than the known polyamides utilized to date, such as the Versamnide 125 resin.

In addition, mixtures of epoxy resins and dendripolyamide H or T were prepared and their functioning as sealant materials was determined. Thus, to an epoxy resin mixture containing the components shown in Table 17(A), a mixture of each of the dendripolyamides or Versamnide 125, with isophoronediamine and trifluoroacetic acid (TFA, CAS No. 76-05-1) was added. The amounts shown for each component is expressed as a percentage of the total weight of the epoxy mixture.

TABLE 17(A)

Epoxy Mixture Components

|  | (%) of Total Weight (A) |
|---|---|
| Epoxy resin (Epon 828) | 52.5 |
| Butyl glycidyl ether | 8.0 |
| Calcium carbonate | 15.5 |
| Silica | 20.0 |
| Titanium dioxide | 4.0 |
| TOTAL | 100 |

TABLE 17(B)

Polyamide Mixture Components

| | Mixture No. (% of total weight of epoxy) | | |
|---|---|---|---|
| | 26 | 27 | 28 |
| Dendripolyamide H | 33.8 | — | — |
| Dendripolyamide T | — | 32.5 | — |
| Versamide 125 | — | — | 29.5 |
| Isophoronediamine | 8.4 | 8.1 | 7.4 |
| TFA | 2.0 | 2.0 | 2.0 |
| TOTAL | 27.8 | 85.0 | 27.2 |

The final mixtures, were then evaluated for their efficacy to function as hardeners in sealant compositions. The following parameters were determined:

TABLE 16

Physical Characteristics of the Different Final Mixtures

| | Mixture No. | | |
|---|---|---|---|
| | 26 | 27 | 28 |
| Density (gr/cm$^3$) | 1.26 | 1.27 | 1.29 |
| Gel time, at room temperature, (min) | 180 | 160 | 160 |
| Compressive strength (MPa) | 118.4 | 116.7 | 96.4 |
| Flexural strength (MPa) | 110.7 | 104.6 | 100.0 |
| Tensile strength (MPa) | 80.3 | 85.2 | 70.9 |
| Tensile elongation (%) | 6.8 | 5.9 | 3.5 |
| Resistance to impact (kJ/m$^2$) | 18.1 | 17.5 | 12.0 |
| Hardness, Shore scleroscope, scale D (deg) | 88 | 87 | 88 |
| Glass transition temperature (° C.) | 92 | 95 | 85 |
| Water absorption[a] (%) | 0.24 | 0.28 | 0.34 |

[a]at room temperature, after 24 hours.

In addition, the three products obtained, having a white color, had no visible defects.

These results show that while the gel time, flexural strength and viscosity of the mixtures are the same, the mixtures containing the dendripolyamides of the present application are more resistant with respect to compressive strength. In addition, the higher glass transition temperatures obtained with these dendripolyamides infer their quality as hardeners of epoxy resins in sealant materials.

What is claimed is:

1. A branched oligomer of general formula (I):

$$R-\left[N(R^1)-R^2\right]_m-N(R^1)(R^1) \quad (I)$$

wherein
- m represents a number of from 1 to 5;
- R represents a monovalent group selected from a linear or branched $C_1$–$C_{18}$ alkyl, cycloalkyl, aralkyl or aryl, which aryl group is optionally substituted with a halogen atom, or a linear of branched $C_1$–$C_{12}$ alkyl, hydroxy, alkyoxy, haloalkyl group; or
- R or $R^1$ represent, independently, a monovalent group of general formula (II):-

$$-\left(CH_2-CH(OH)-CH_2-R^3\right)_u-CH_2-CH(OH)-CH_2-NH- \quad (II)$$

$$-R^4-NH-\left[C(O)-R^5-\left(C(O)-NH-R^6-NH\right)_n\right]_p-H$$

wherein
- p represents a number between 0.1 and 18.0
- u represents a number between 0.1 and 18.0;
- n represents a number between 0.2 and 1.5;
- $R^3$ represents
  (i) a bivalent group of the general formula (III):

$$-O-\left[Y-\text{Ar}(X,X)-A-\text{Ar}(X,X)-Z\right]_q-O- \quad (III)$$

wherein
- q represents a number of from 1 to 20;
- A represents a linear or branched alkylene or alkenylene, all of which are optionally substituted with one or more halogen atoms, or A represents a sulfonylene group;
- Y and Z, being the same or different, represent a valency bond or a linear or branched alkylene or alkenylene, or a group of the general formula: —O—$R^7$—;
  wherein,
  - $R^7$ represents a linear or branched lower alkylene or alkenylene, all of which is optionally substituted with one or more hydroxyls; and
  - X represents a hydrogen or a halogen atom or a lower alkyl;
  (ii) a bivalent group of general formula (IV)-:-

$$-O-\left[R^8-O\right]_s- \quad (IV)$$

wherein
- s represents a number of from 1 to 100 and $R^8$ represents a group selected from a linear or branched alkylene, alkenylene, cycloalkylene, cycloalkenylene or arylene, which group is optionally substituted with one or more alkyls or alkoxyls, and which aromatic ring or alkylene group is optionally substituted with one or more halogen atoms;

(iii) a bivalent dioxy group of general formula (V):-

(V)

wherein
- W represents a $C_1$–$C_3$ alkylene; and
- $R^9$ represents a linear or branched alkylene or alkenylene;

(iv) a bivalent group having the following formulae VII(a) to VII(d):-

(VIIa) N,N-aniline    (VIIb) N,N'-(2-imidazolidone)

(VIIc) N,N'-(2-benze-2-imidazolidone)    (VIId) N,N'-hydantoin all of which are optionally substituted with one or more linear or branched alkyls, haloalkyls, oxides, or halogen atoms; or (v) a bivalent group of general formula (VIII):-

$$-O-Y-\text{Cy}-A-\text{Cy}-Z-O- \quad (VIII)$$

wherein A, Y and Z are as hereinbefore defined;

- $R^4$ represents the group of the general formulae (Xa) or (Xb):-

$$-R^6-NH-C(O)-R^5-C(O)-NH-R^6-NH-C(O)-D-C(O)-NH-R^6- \quad (Xa)$$

$$-R^6-NH-C(O)-R^5-C(O)-NH-R^6-NH-CH_2- \quad (Xb)$$

-continued

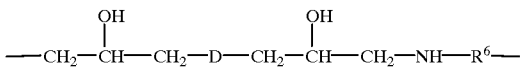

in which D represents a linear of branched dioxyalkylene, dioxyalkenylene, dioxycycloalkylene, dioxycycloalkenylene, dioxyarylalkenylene, sulfonylene, dioxyarylene, dioxyaralkylene, all of which are optionally substituted by one or more alkyls, hydroxyls, or halogen atoms, which cyclic groups are monocyclic or polycyclic, or D represents a group of the general formula (VIII), wherein A, Y and Z are as hereinbefore defined;

-$R^4$ or $R^6$, independently, represent a bivalent polyaminoalkylene: group of the general formula —$(CH_2CH_2NH)_r$—$CH_2CH_2$—, wherein r is a number between 1 to 6;

-$R^5$ represents a bivalent group of the general formula $C_tH_v$, in which t and v represent independently a number of from 1 to 100 and is selected from a linear or branched alkylene, alkenylene, cycloalkylene, cycloalkenylene, aralkylene;

-$R^2$ represents a bivalent linear or branched alkylene or alkenylene, cycloalkylene, cycloalkenylene, arylene, aralkylene, or a group of general formula (XI):-

—$(R^{10}—O)_k R^{10}$— (XI)

wherein $R_{10}$ represents a lower alkylene which are optionally substituted by one or more halogen atoms, and k is a number of between 1 to 20 or $R^2$ represents a bisamide of the general formula (XII):-

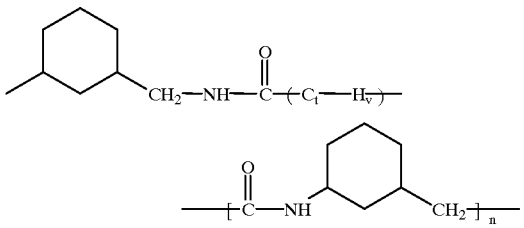

(XII)

wherein t, v and n are as hereinbefore defined, which bisamide are optionally substituted with one or more linear or branched alkyls, or with halogen atoms.

2. The branched oligomer as claimed in claim 1, wherein when R and $R^1$ are different, R represents a monovalent group selected from a lower alkyl, a cyclohexyl, a phenyl or a benzyl, said cyclohexyl, phenyl or benzyl is optionally substituted with one or more $C_1$–$C_{12}$ alkyl or alkoxy groups and $R^1$ represents a group of the general formula (II).

3. The branched oligomer as claimed in claim 2, wherein when R and $R^1$ are different, R represents a butyl, a octyl or a cyclohexyl group.

4. The branched oligomer as claimed in claim 1, wherein $R^3$ represents the group of the general formula (III) or (VII), in which A represents a lower alkylene; Y and Z represent a valency bond and q is equal to 1, each ring independently is optionally substituted with one or more halogen atoms.

5. The branched oligomer as claimed in claim 1, wherein $R^3$ represents the group of the general formula —O—$R^7$— in which $R^7$ represents a lower alkylene which is optionally substituted with one of more hydroxyls.

6. The branched oligomer as claimed in claim 1, wherein $R^3$ represents the group of the general formula (IV), in which
when s is equal to 1, $R^8$ represents a group selected from a linear or branched alkylene, cycloalkylene, cycloalkenylene or arylene, which groups are optionally substituted, with one or more alkyls, and which aromatic ring or alkylene group is optionally substituted with one or more halogen atoms;
when s is a number greater than 1, $R^8$ represents a linear or branched alkylene which is optionally substituted with one of more alkoxy, cycloalkyl, or aryl groups or with one or more halogen atoms.

7. The branched oligomer as claimed in claim 6, wherein said $R^8$ represents a lower alkylene selected from 1,2-ethylene, 1,2-isopropylene, 1,4-butylene and 1,6-cyclohexylene, all of which are optionally substituted with one or more halogen atoms and s represents a number of between 1 to 15; or $R^8$ represents an arylene group selected from 1,3- or 1,4-phenylene, 1,4-xylylene, 1,8-, 1,5- 2,7- or 3,7-naphthylene or 9,10-anthracylene all of which are optionally substituted with one or more halogen atoms, and s is equal to 1.

8. The branched oligomer as claimed in claim 7, wherein when s is equal to 1, $R^8$ represents the group selected from 1,2-ethylene, 1,4-butylene, or 1,6-hexylene and when s is greater than 1, $R^8$ represents the group selected from 1,2-ethylene, 1,2- isopropylene, or 1,2-(3-chloroisopropyl)ene.

9. The branched oligomer as claimed in claim 1, wherein $R^3$ represents the group of the general formula (V), in which W and $R^9$ both represent a methylene; or $R^3$ represents the group selected from N,N-aniline, N,N'-(2-imidazolidone), N,N'- hydantoin, N,N'-(benze-2-imidazolidone), all of which is optionally substituted with one or more lower alkyls or halogen atoms.

10. The branched oligomer as claimed in claim 1, wherein $R^3$ is selected from the group consisting of 2,2-[bis(4-oxyphenyl)]propylene, bis(4-oxyphenyl)methylene, 2,2-[bis (3,5-bromo-4-oxyphenyl)]propylene, 1,3- or 1,4-phenylene, 1,8-dioxyphenylene, 1,4-[bis(oxymethyl)]phenylene, 1,1-[bis(oxymethyl)]cyclohex-3-enylene, 1,2 -dioxyethylene, (1,3,3-trimethylcyclohex-1-yl-5-ene)methylene, N,N-aniline, N,N-(2,4,6-tribromoaniline), N,N'-(5,5'-dimethyl) hydantoin, 1,2-(2,4,6-tribromo)-dioxphenylene, 1,4-dioxybutylene, 1,2-dioxypropylene, 1,6-dioxyhexylene.

11. The branched oligomer as claimed in claim 1, wherein $R^4$ or $R^6$ represent independently a polyaminoalkylene of the general formula —$(CH_2CH_2NH)_r$—$CH_2CH_2$-, wherein r is a number of between 1 to 6, or when $R^4$ and $R^6$ are different, $R^4$ represents the group of the general formula (Xa) in which D is selected from 1,8-octylene, 1,2-(4-methyl)cyclohex-4-enylene, or 1,2-bicyclo[2.2.1]hept-2-enylene, or $R^4$ represents the group of the general formula (Xb) in which D is selected from bis(4-oxyphenyl) sulfonylene, 1,6-dioxyhexylene, or 2,2-bis(4-oxyphenyl)-1,1,1,3,3,3-hexafluoropropylene.

12. The branched oligomer as claimed in claim 1, wherein $R^5$ is a product of a dienic Diels-Alder or an enic Alder-Ene reaction between fatty acids comprising from 15 to 22 carbon atoms or lower alkyl esters of such acids, or $R^5$ represents an alkylene of the general formula —$(C_tH_v)$— in which t and v represent independently numbers of between 1 to 100, or [1,4]-, [1,3]-, or [1,2]-phenylene, [1,2]-cyclohexylene, [1,2]-cyclohex-4-enylene, 1,2-(4-methyl) cyclohex-4-enylene, 1,2-bicyclo[2.2.1]hept-2-enylene, 1,2-(4-methylbicyclo[2.2.1 ]hept-2-enylene).

13. The branched oligomer as claimed in claim 1, wherein $R^2$ represents a lower alkylene, 1,4- or 1,3- phenylene, 1,3- or 1,4- xylylene; 1,4- or 1,3-cyclohexylene, (1,1,3-trimethylcyclohex-5-yl)methylene, the group of the general formula (XI) in which $R^{10}$ represents isopropylene and k is a number of between 1 to 10, or the bisamide of the formula:

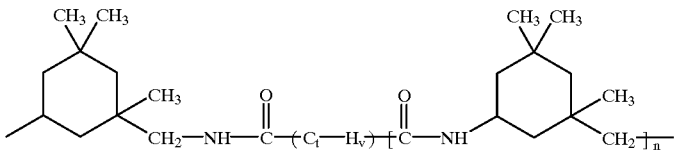

wherein t and v are as hereinbefore defined.

14. The branched oligomer as claimed in claim 1, wherein m is equal to 1, R and $R^1$ are the same and represent the group of general formula (II), in which
 p and u are equal to 1, n is equal to 0.75;
 $R^3$ represents 2,2-[bis(4-oxyphenyl)]propylene;
 $R^4$ and $R^6$ are the same and represent —(CH$_2$CH$_2$NH)$_3$—CH$_2$CH$_2$—;
 $R^5$ represents the group —(C$_{29.8}$H$_{55.2}$)—; and
 $R^2$ represents a 1,2-ethylene.

15. The branched oligomer as claimed in claim 1, wherein m is equal to 1, and R and $R^1$ are the same and represent the group of general formula (II), in which
 p is equal to 1, u is equal to 1.5, and n is equal to 1.07;
 R represents 2,2-[bis(4-oxyphenyl)]propylene;
 $R^4$ and $R^6$ are the same and represent —(CH$_2$CH$_2$NH)$_2$—CH$_2$CH$_2$—;
 $R^5$ represents the group —(C$_{35.2}$H$_{65.2}$)—; and
 $R^2$ represents 1,6-hexylene.

16. The branched oligomer as claimed in claim 1, wherein m is equal to 1, R represents cyclohexyl, $R^1$ represents the group of general formula (II), in which
 p is equal to 1, u is equal to 6.18, n is equal to 1.05;
 $R^3$ represents 2,2-[bis(4-oxyphenyl)]propylene;
 $R^4$ and $R^6$ are the same and represent —(CH$_2$CH$_2$NH)$_2$—CH$_2$CH$_2$—;
 $R^5$ represents the group —(C$_{34.}$H$_{64.4}$)—; and
 $R^2$ represents 1,3-propylene.

17. A branched oligomer as claimed in claim 1, wherein m is equal to 1, R and $R^1$ are the same and represent the group of general formula (II), in which
 p is equal to 1, u is equal to 1.18 and n is equal to 1.45;
 $R^3$ represents 2,2-[bis(4-oxyphenyl)]propylene;
 $R^4$ and $R^6$ are the same and represent —CH$_2$—CH$_2$—NH—CH$_2$—CH$_2$—;
 R represents the group —(C$_{41.6}$H$_{81.2}$)—; and
 $R^2$ represents (1,3,3-trimethylcyclohex-5-yl)methylene.

18. A branched oligomer as claimed in claim 1, wherein m is equal to 3, R and $R^1$ are the same and represent the group of general formula (II), in which
 p is equal to 1.6, u is equal to 4.31, and n is equal to 1;
 $R^3$ represents 1,2-dioxypropylene;
 $R^4$ and $R^6$ are the same and represent —(CH$_2$CH$_2$NH)$_2$—CH$_2$CH$_2$—;
 $R^5$ represents the group —(C$_{34.0}$H$_{66.4}$)—; and
 $R^2$ represents 1,2-ethylene.

19. The branched oligomer as claimed in claim 1, wherein m is equal to 1, R and $R^1$ are the same and represent the group of general formula (II), in which
 p is equal to 2.14, u and n are both equal to 1;
 $R^3$ represents the 1,3-dioxyphenylene;
 $R^4$ and $R^6$ are the same and represent the group-(CH$_2$CH$_2$NH)$_3$—CH$_2$CH$_2$—;
 $R^5$ represents the group —(C$_{34.0}$H$_{66.4}$)—; and
 $R^2$ represents 1,3-phenylene.

20. The branched oligomer as claimed in claim 1, wherein m is equal to 4, R and $R^1$ are the same and represent the group of general formula (II), in which
 -p and u are both equal to 1, n is equal to 0.5;
 -$R^3$ represents the group 1,4-dioxybutylene;
 -$R^4$ represents the group of general formula (Xa) in which D is a 1,8-octylene;
 -$R^5$ represents the average group —(C$_{29.8}$H$_{55.2}$)—; and
 -$R^6$ represents the group —(CH$_2$CH$_2$NH)$_3$—CH$_2$CH$_2$—; and
 $R^2$ represents 1,2-ethylene.

21. The branched oligomer as claimed in claim 1, wherein m is equal to 1, R and $R^1$ are the same and represent the group of general formula (II), in which
 -p and u are both equal to 1, n is equal to 1.14;
 -$R^3$ represents the group 1,1-[bis(oxymethyl)]cyclohex-3-enylene;
 -$R^4$ represents the group of general formula (Xa) in which D represents 1,2-(4-methyl)cyclohex-4-enylene;
 -$R^5$ represents the group —(C$_{35.2}$H$_{65.2}$)—;
 -$R^6$ represents —(CH$_2$CH$_2$NH)$_2$—CH$_2$CH$_2$—; and
 -$R^2$ represents 1,4-xylylene.

22. The branched oligomer as claimed in claim 1, wherein m is equal to 1, R and $R^1$ are the same and represent the group of general formula (II), in which
 -p is equal to 1.66, u and n are equal to 1;
 -$R^3$ represents the group 2,2-bis[3,5-dibromo-4-oxyphenyl)propylene;
 -$R^4$ represents the group of general formula (Xa), in which D represents 1,2-bicyclo [2.2.1]hept-4-enylene;
 -$R^5$ represents the group —(C$_{34.0}$H$_{66.4}$)—;
 -$R^6$ represents the group —(CH$_2$CH$_2$NH)$_3$—CH$_2$CH$_2$—; and
 -$R^2$ represents 1,4-cyclohexylene.

23. The branched oligomer as claimed in claim 1, wherein m is equal to 1, R and $R^1$ are the same and represent the group of general formula (II), in which
 -p and u are equal to l, n is equal to 1.14;
 -$R^3$ represents N,N-(2,4,6-tribromoaniline);
 -$R^4$ represents the group of general formula (Xb) in which D represents bis(4-oxyphenyl) sulfonylene;
 -$R^5$ represents the average group —(C$_{35.2}$H$_{65.2}$)—;
 -$R^6$ represents the group —(CH$_2$CH$_2$NH)$_2$—CH$_2$CH$_2$—; and
 -$R^2$ represents the polyisopropylene glycol of the formula:

—CH$_2$CH(CH$_3$)—O)$_{5.62}$—CH$_3$CH(CH$_3$—.

24. The branched oligomer as claimed in claim 1, wherein m is equal to 1, R and $R^1$ are the same and represent the group of general formula (II), in which
- p and u are both equal to 1, n is equal to 1.10;
- $R^3$ represents an N,N-aniline;
- $R^4$ represents the group of general formula (Xb) in which D represents 1,6-dioxyhexylene;
- $R^5$ represents the group $-(C_{34.8}H_{64.4})-$;
- $R^6$ represents $-(CH_2CH_2NH)_2-CH_2CH_2-$; and
- $R^2$ represents the bisamide group:

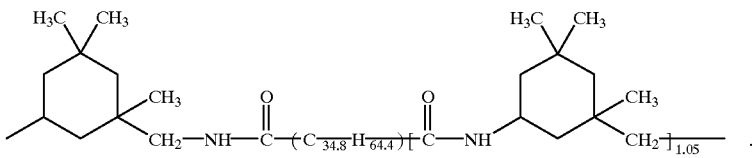

25. The branched oligomer as claimed in claim 1, wherein m is equal to 1, R and $R^1$ are the same and represent the group of general formula (II), in which
- p is equal to 1.7, u and n are both equal to 1;
- $R^3$ represents N,N'-(5,5'-dimethyl)hydantoin;
- $R^4$ represents the group of general formula (Xb) in which D represents 2,2'-[bis(4-oxyphenyl)-1,1,1,3,3,3-hexafluoropropylene;
- $R^5$ represents the average group $-(C_{35.2}H_{65.2})-$; and
- $R^6$ represents $-(CH_2CH_2NH)_2-CH_2CH_2-$; and
- $R^2$ represents p-tolylene.

26. A process for the preparation of a branched oligomer comprising the steps of:
(a) dissolving a mole of an n-functional polyamine compound and n moles of a diepoxy compound, wherein n represents a number of from 3 to 15, in an aprotic, polar solvent and mixing the same;
(b) optionally further mixing, the solution resulting from step (a) for at least 30 min, at room temperature;
(c) heating the mixture resulting from step (a) or from step (b) to a temperature of from 50° C. to 80° C., for at least 1 hour, thus allowing the formation of an n-functional polyepoxy adduct;
(d) mixing n moles of a polyamine-polyamide oligomer, end-capped with free amino groups dissolved in a solvent, with 1 mole of the n-functional polyepoxy adduct resulting from step (c);
(e) optionally further mixing the mixture resulting from (d), for at least 1 hour, at room temperature;
(f) heating the mixture resulting from step (d) or from step (e) to a temperature of between 60° C. to 100° C., for at least 2 hrs, thus allowing the formation of a branched polyamide oligomer; and
(g) optionally, isolating the branched oligomer obtained in (f).

27. The process as claimed in claim 26, wherein in step (a) said n-functional polyamine is a compound of the general formula (1) in which
m represents a number from 1 to 5;
$R^2$ represents a bivalent linear or branched alkylene or alkenylene, cycloalkylene, cycloalkenylene, arylene, aralkylene, or a group of general formula (XII):

wherein $R^{10}$ represents a lower alkylene which are optionally substituted by one or more halogen atoms, and k is a number of between 1 to 20 or $R^2$ represents a bisamide of the general formula (XII):

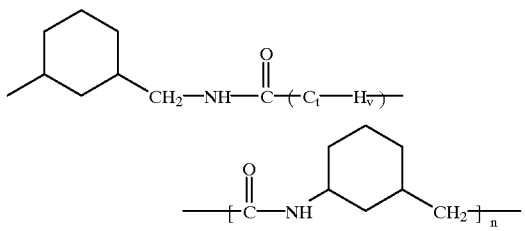

wherein t, v and n are as hereinbefore defined, which bisamide are optionally substituted with one or more linear or branched alkyls, or with halogen atoms;
R represents a hydrogen atom or a monovalent group selected from a linear or branched $C_1$–$C_{12}$alkyl, cycloalkyl, aralkyl or aryl, which aryl group is optionally substituted with a halogen atom, or a linear or branched $C_1$–$C_{12}$ alkyl, hydroxy, alkoxy, haloalkyl group; and
$R^1$ represent a hydrogen atom.

28. The process as claimed in claim 26, wherein in step (a) said diepoxy compound is represented by the following general formula (XIII):-

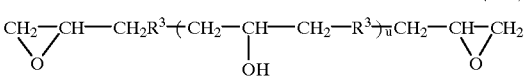

wherein
u represents a number between 0.1 and 18.0; and
$-R^3$ represents
(i) a bivalent group of the general formula (III):

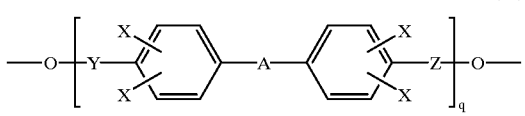

wherein
-q represents a number of from 1 to 20;

- A represents a linear or branched alkylene or alkenylene, all of which is optionally substituted with one or more halogen atoms,- or A represents a sulfonylene group;
  - Y and Z, being the same or different, represent a valency bond or a linear or branched alkylene or alkenylene, or a group of the general formula: —O—$R^7$—;
    wherein,
    - $R^7$ represents a linear or branched lower alkylene or alkenylene,
    all of which are optionally substituted with one or more hydroxyls; and
- X represent a hydrogen or a halogen atom or a lower alkyl;
  (ii) a bivalent group of general formula (IV):-

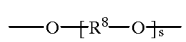

(IV)

wherein

- s represents a number of from 1 to 100 and $R^8$ represents a group selected from a linear or branched alkylene, alkenylene, cycloalkylene, cycloalkenylene, or arylene, which group is optionally substituted with one or more alkyls or alkoxyls, and which aromatic ring or alkylene group is optionally substituted with one or more halogen atoms;
  (iii) a bivalent dioxy group of general formula (V):-

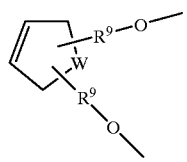

(V)

wherein

- W represents a $C_1$–$C_3$ alkylene; and
- $R^9$ represents a linear or branched alkylene or alkenylene;
  (iv) a bivalent group having the following formulae VII(a) to VII(c):

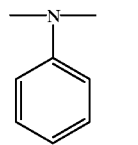

(VIIa) N,N-aniline

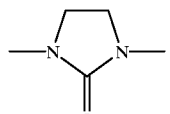

(VIIb) N,N'-(2-imidazolidone)

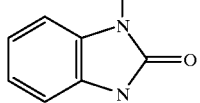

(VIIc) N,N'-(2-benze-2-imidazolidone)

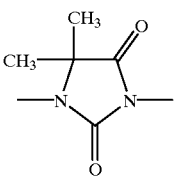

(VIId) N,N'-hydantoin all of which are optionally substituted with one or more linear or branched alkyls, haloalkyls, oxides, or halogen atoms; or
(v) a bivalent group of general formula (VIII):-

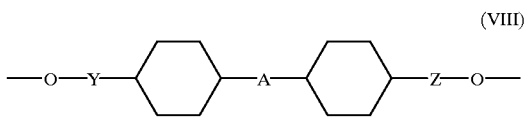

(VIII)

wherein A, Y and Z are as hereinbefore defined;

29. The process as claimed in claim 26, wherein in step (c), said n-functional polyepoxy adduct is represented by the following general formula (XIV):-

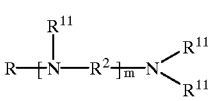

(XIV)

wherein
- m represents a number from 1 to 5;
- R represents a monovalent group selected from a linear or branched $C_1$–$C_{18}$ alkyl, cycloalkyl, aralkyl or aryl, which aryl group is optionally substituted with a halogen atom, or a linear of branched $C_1$–$C_{12}$ alkyl, hydroxy, alkyoxy, haloalkyl group; or
- R and $R^{11}$ represent, independently, a monovalent group of the following general formula (XV):-

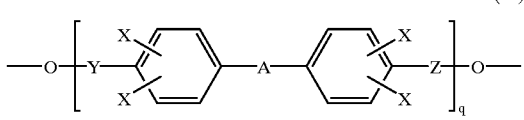

(III)

wherein u represents a number between 0.1 to 18.0; and
- $R^3$ represents
  (i) a bivalent group of the general formula (III):
wherein
- q represents a number of from 1 to 20;
- A represents a linear or branched alkylene or alkenylene, all of which are optionally substituted with one or more halogen atoms, or A represents a sulfonylene group;
- Y and Z, being the same or different, represent a valency bond or a linear or branched alkylene or alkenylene, or a group of the general formula: —O—$R^7$—;

wherein,

-R$^7$ represents a linear or branched lower alkylene or alkenylene, all of which is optionally substituted with one or more hydroxyls; and -X represents a hydrogen or a halogen atom or a lower alkyl;

(ii) a bivalent group of general formula (IV):-

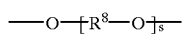

(IV)

wherein

-s represents a number of from 1 to 100 and R$^8$ represents a group selected from a linear or branched alkylene, alkenylene, cycloalkylene, cycloalkenylene or arylene, which group is optionally substituted with one or more alkyls or alkoxyls, and which aromatic ring or alkylene group is optionally substituted with one or more halogen atoms;

(iii) a bivalent dioxy group of general formula (V):-

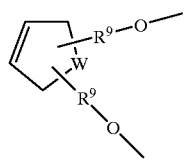

(V)

wherein

-W represents a C$_1$-C$_3$ alkylene; and

-R$^9$ represents a linear or branched alkylene or alkenylene;

(iv) a bivalent group having the following formulae VII(a) to VII(d):-

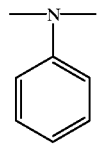

(VIIa) N,N-aniline

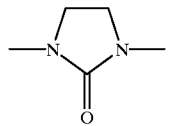

(VIIb) N,N'-(2-imidazolidone)

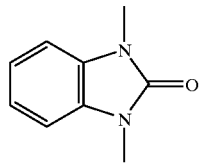

(VIIc) N,N'-(2-benze-2-imidazolidone)

-continued

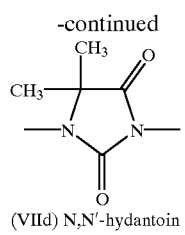

(VIId) N,N'-hydantoin all of which are optionally substituted with one or more linear or branched alkyls, haloalkyls, oxides, or halogen atoms; or (v) a bivalent group of general formula (VIII):-

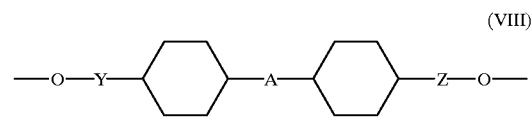

(VIII)

wherein A, Y and Z are as hereinbefore defined;

R$^2$ represents a bivalent linear or branched alkylene or alkenylene, cycloalkylene, cycloalkenylene, arylene, aralkylene, or a group of general formula (XI):-

(XI)

wherein R$_{10}$ represents a lower alkylene which are optionally substituted by one or more halogen atoms, and k is a number of between 1 to 20 or R$^2$ represents a bisamide of the general formula (XII):

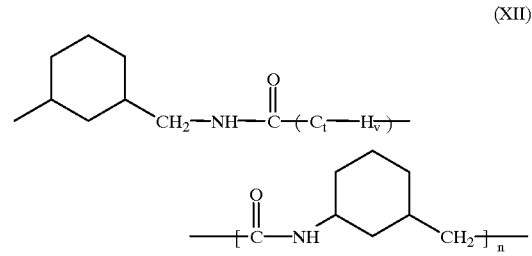

(XII)

wherein t, v and n are as hereinbefore defined, which bisamide are optionally substituted with one or more linear or branched alkyls, or with halogen atoms.

30. The process as claimed in claim 26, wherein in step (d) said polyamine-polyamide oligomer is represented by the following general formula (XVI):

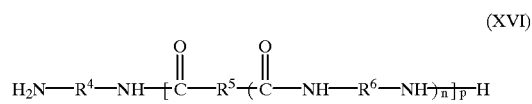

(XVI)

wherein p represents a number between 0.1 and 18.0 n represents a number between 0.2 and 1.5;

R$^4$ represents the group of the general formulae (Xa) or (Xb):

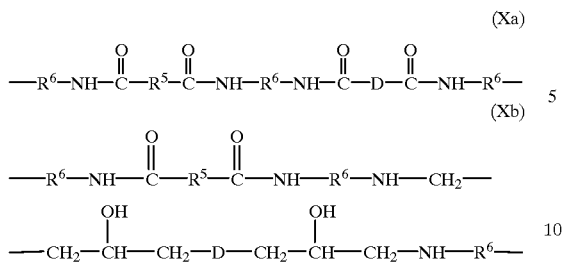

(Xa)

(Xb)

in which D represents a linear of branched dioxyalkylene, dioxyalkenylene, dioxycycloalkylene, dioxycycloalkenylene, dioxyarylalkenylene, sulfonylene, dioxyarylene, dioxyaralkylene, all of which are optionally substituted by one or more alkyls, hydroxyls, or halogen atoms, which cyclic groups are monocyclic or polycyclic, or D represents a group of the general formula (VIII), wherein A, Y and Z are as hereinbefore defined;

$R^4$ or $R^6$, independently, represent a bivalent polyaminoalkylene: group of the general formula —(CH$_2$CH$_2$NH)$_r$—CH$_2$CH$_2$—, wherein r is a number between 1 to 6;

$R^5$ represents a bivalent group of the general formula $C_tH_v$ in which t and v represent independently a number of from 1 to 100 and is selected from a linear or branched alkylene, alkenylene, cycloalkylene, cycloalkenylene, aralkylene.

31. The process as claimed in claim 30, wherein said polyamine-polyamide oligomer is prepared by the following steps
   (i) preparing fatty acid monomers by hydrolysis or methanolysis of an oil selected from the group consisting of bean oil, sunflower oil, castor oil, soya oil, cotton seed oil, anise oil, coconut oil or rape oil; and
   (ii) oligomerizing said fatty acid monomers obtained in step (i) in the presence of a catalyst.

32. The process as claimed in claim 26, wherein in step (a) said aprotic polar solvent is a solvent having a boiling point lower than 60° C.

33. The process as claimed in claim 32, wherein said aprotic polar solvent is an aromatic hydrocarbon selected from toluene, xylene, ethylbenzene or isopropylbenzene; an ether selected from dibutyl ether, dihexyl ether, anisole, phenetole or dioxane; an ester selected from ethyl acetate, butyl acetate, dibuthyl phthalate, dioctyl phthalate, tricresyl phosphate or any other aprotic solvent selected from nitromethane, nitroethane, N-methyl pyrrolidinone, and any mixtures of said solvents.

34. The process as claimed in claim 26, wherein in step (d) said solvent is an alcohol selected from ethyl alcohol, isopropyl alcohol, propyl alcohol, butyl alcohol, benzyl alcohol, ethylene glycol, diethylene glycol, poly (oxyethylene)glycol, poly(oxypropylene)glycol, glycerol, or erythritol; a phenol selected from phenol, cresol, xylenol, or dioxydiphenyl methane, or tetrahydrofuran or any mixture of said solvents.

35. A process for the preparation of a dendripolyamide E, comprising the steps of:
   (a) dissolving a mole of ethylenediamine and 4 moles of diglycidyl ether of Bisphenol A in ethyl acetate and mixing the same;
   (b) optionally further mixing the solution resulting from (a) for at least 30 min, at room temperature;
   (c) heating the mixture resulting from (a) or from (b) to a temperature of from 50° C. to 80° C., for at least 1 hour, thus allowing the formation of a 4-functional polyepoxy adduct;
   (d) mixing about 4 moles of a polyamine-polyamide oligomer, dissolved in a ethyl alcohol, with a mole of the 4-functional polyepoxy adduct resulting from (c), which polyamine-polyamide oligomer is prepared by the steps comprising:
      (i) preparing fatty acid monomers by methanolysis of bean oil;
      (ii) oligomerizing the monomers resulting from step (i) in the presence of adipic acid and activated aluminum oxide, thus obtaining predominantly dimers thereof,
      (iii) polycondensing the oligomer resulting from step (ii) with from about 5% to about 20% excess of tetraethylenepentamine to give a polyamide-polyamine oligomer;
   (e) optionally further mixing the mixture resulting from (d), for at least 1 hour, at room temperature;
   (f) heating the mixture resulting from (d) or in (e) to a temperature of between 60° C. to 1 00° C., for at least 2 hrs, thus allowing the formation of the dendripolyamide E; and
   (g) optionally, isolating the dendripolyamide E resulting from (f).

36. A process for the preparation of dendripolyamide H comprising the steps of:
   (a) dissolving a mole of hexamethylenediamine and 4 moles of poly (Bisphenol A-co-epichlorohydrin) glycidyl end-capped in 1,4-dioxane and 2-propanol and mixing the same;
   (b) optionally further mixing the solution resulting from (a) for at least 30 min, at room temperature;
   (c) heating the mixture resulting from (a) or from (b) to a temperature of from 50° C. to 80° C., for at least 1 hour, thus allowing the formation of a 4-functional polyepoxy adduct;
   (d) mixing about 4 moles of a polyamine-polyamide oligomer, dissolved in ethanol, with a mole of the 4-functional polyepoxy adduct resulting from (c), which polyamine-polyamide oligomer is prepared by the steps comprising:
      (i) preparing fatty acid monomers by methanolysis of bean oil;
      (ii) oligomerizing the monomers resulting from (i) in the presence of sebacic acid and activated aluminum oxide, thus obtaining predominantly dimers thereof;
      (iii) polycondensing the oligomer resulting from step (ii) with from about 5% to about 20% triethylenetetramine to give a polyamide-polyamine oligomer;
   (e) optionally further mixing the mixture resulting from (d), for at least 1 hour, at room temperature;
   (f) heating the mixture resulting from (d) or from (e) to a temperature of between 60° C. to 100° C., for at least 2 hrs, thus allowing the formation of the dendripolyamide H; and
   (g) optionally, isolating the dendripolyamide H resulting from (f).

37. A process for the preparation of dendripolyamide C comprising the steps of:
   (a) dissolving a mole of N-cyclohexyl-1,3-propanediamine and 3 moles of poly (Bisphenol A-co-epichlorohydrin) glycidyl end-capped 1004 in butyl acetate and mixing the same;

(b) optionally further mixing the solution resulting from step (a) for at least 30 min, at room temperature;

(c) heating the mixture resulting from (a) or from (b) to a temperature of from 50° C. to 80° C., for at least 1 hour, thus allowing the formation of a 3-functional polyepoxy adduct;

(d) mixing about 3 moles of a polyamine-polyamide oligomer, dissolved in 2-propanol, with a mole of the 3-functional polyepoxy adduct resulting from (c), which polyamine-polyamide oligomer is prepared by a process comprising the steps of:
  (i) preparing fatty acid monomers by methanolysis of sunflower oil;
  (ii) oligomerizing the monomers resulting from step (i) in the presence of terephthalic acid and activated aluminum oxide, thus obtaining predominantly dimers thereof;
  (iii) polycondensing the oligomer resulting from step (ii) with from about 5% to about 20% triethylenetetramine to produce a polyamide-polyamine oligomer;

(e) optionally further mixing the mixture resulting from (d), for at least 1 hour, at room temperature;

(f) heating the mixture resulting from (d) or from (e) to a temperature of between 60° C. to 100° C., for at least 2 hrs, thus allowing the formation of the dendripolyamide C; and (g) optionally, isolating the dendripolyamide C resulting from (f).

38. A process for the preparation of dendripolyamide I comprising the steps of:
(a) dissolving a mole of isophoronediamine and 4 moles of poly (Bisphenol A-co-epichlorohydrin) glycidyl end-capped in butyl acetate and mixing the same;

(b) optionally further mixing the solution resulting from (a) for at least 30 min, at room temperature;

(c) heating the mixture resulting from step (a) or from step (b) to a temperature of from 50° C. to 80° C., for at least 1 hour, thus allowing the formation of a 4-functional polyepoxy adduct;

(d) mixing about 4 moles of a polyamine-polyamide oligomer, dissolved in 2-propanol, with a mole of the 4-functional polyepoxy adduct resulting from (c), which polyamine-polyamide oligomer is prepared by the process comprising the steps of:
  (i) preparing fatty acid monomers by methanolysis of castor oil;
  (ii) oligomerizing the monomers resulting from (i) in the presence of salicylic acid and activated aluminum oxide, thus obtaining predominantly dimers thereof;
  (iii) polycondensing the oligomer resulting from'step (ii) with from about 5% to about 20% diethylenetriamine to produce a polyamide-polyamine oligomer;

(e) optionally further mixing the mixture resulting from (d), for at least 1 hour, at room temperature;

(f) heating the mixture resulting from step (d) or from step (e) to a temperature of between 60° C. to 100° C., for at least 2 hrs, thus allowing the formation of the dendripolyamide I; and (f) optionally, isolating the dendripolyamide I resulting from (f).

39. A process for the preparation of dendripolyamide T comprising the steps of:
(a) dissolving a mole of triethylenetetramine and 6 moles of poly(propylene glycol)diglycidyl ether in ethyl acetate and mixing the same;

(b) optionally further mixing the solution resulting from (a) for at least 30 min, at room temperature;

(c) heating the mixture resulting from (a) or from (b) to a temperature of from 50° C. to 80° C., for at least 1 hour, thus allowing the formation of a 6-functional polyepoxy adduct;

(d) mixing about 6 moles of a polyamino-polyamide oligomer dissolved in 2-propanol, with a mole of the 6-functional polyepoxy adduct resulting from (c);

(e) optionally further mixing the mixture resulting from (d), for at least 1 hour, at room temperature;

(f) heating the mixture resulting from (d) or from (e) to a temperature of between 60° C. to 100° C., for at least 2 hrs, thus allowing the formation of the dendripolyamide T; and (g) optionally, isolating the dendripolyamide T resulting from (f).

40. A process for the preparation of dendripolyamide MP comprising the steps of:
(a) dissolving a mole of 1,3-phenylenediamine and 4 moles of resocinol diglycidyl ether dioxane and mixing the same;

(b) optionally further mixing the solution resulting from step (a) for at least 30 min, at room temperature;

(c) heating the mixture resulting from (a) or from step (b) to a temperature of from 50° C. to 80° C., for at least 1 hour, thus allowing the formation of a 4-functional polyepoxy adduct;

(d) mixing about 4 moles of a polyamino-polyamide oligomer, dissolved in dioxane, with a mole of the 4-functional polyepoxy adduct resulting from (c);

(e) optionally further mixing the mixture resulting from (d), for at least 1 hour, at room temperature;

(f) heating the mixture resulting from (d) or from (e) to a temperature of between 60° C. to 100° C., for at least 2 hrs, thus allowing the formation of the dendripolyamide MP; and (g) optionally, isolating the dendripolyamide MP resulting from (f).

41. A process for the preparation of dendripolyamide TP comprising the steps of:
(a) dissolving a mole of tetraethylenepentamine and 7 moles of 1,4-butanediol diglycidyl ether in ethyl acetate and mixing the same;

(b) optionally further mixing the solution resulting from (a) for at least 30 min, at room temperature;

(c) heating the mixture resulting from (a) or from step (b) to a temperature of from 50° C. to 80° C., for at least 1 hour, thus allowing the formation of a 7-functional polyepoxy adduct;

(d) mixing about 7 moles of a polyamine-polyamide oligomer, dissolved in isopropyl alcohol, with a mole of the 7-functional polyepoxy adduct resulting from (c), which polyamine-polyamide oligomer is prepared by the steps comprising:
  (i) preparing fatty acid monomers by methanolysis of bean oil;
  (ii) oligomerizing the monomers resulting from (i) in the presence of adipic acid and activated aluminum oxide, thus obtaining predominantly dimers thereof,
  (iii) polycondensing the oligomer resulting from step (ii) with from about 5% to about 20% tetraethylenepentamine to give an initial polyamide-polyamine oligomer;

(iv) oligomerizing the initial polyamide-polyamine oligomer resulting from step (iii) with sebacic acid thus forming predominantly polyamide-polyamine trimers;

(e) optionally further mixing the mixture resulting from (d), for at least 1 hour, at room temperature;

(f) heating the mixture resulting from (d) or from (e) to a temperature of between 60° C. to 100° C., for at least 2 hrs, thus allowing the formation of the dendripolyamide TP; and (g) optionally isolating the dendripolyamide resulting from step (f).

42. A process for the preparation of dendripolyamide X comprising the steps of:

(a) dissolving a mole of xylylendiamine and 4 moles of 1,1-dioxymethyl cyclohexene 4-diglycidyl ether in benzyl alcohol and mixing the same;

(b) optionally further mixing the solution resulting from (a) for at least 30 min, at room temperature;

(c) heating the mixture resulting from (a) or from (b) to a temperature of from 50° C. to 80° C., for at least 1 hour, thus allowing the formation of a 4-functional polyepoxy adduct;

(d) mixing about 4 moles of a polyamine-polyamide oligomer, dissolved in tetrahydrofuran, with a mole of the 4-functional polyepoxy adduct resulting from (c), which polyamine-polyamide oligomer is prepared by the steps comprising:

(i) preparing fatty acid monomers by methanolysis of bean oil;

(ii) oligomerizing the monomers resulting from step (i) in the presence of sebacic acid and activated aluminum oxide, thus obtaining predominantly dimers thereof, (iii) polycondensing the oligomer resulting from step (ii) with from about 5% to about 20% excess of triethylenetetramine to give an initial polyamide-polyamine oligomer;

(iv) further oligomerizing the initial polyamide-polyamine oligomer resulting from step (iii) with methyltetrahydrophthalic anhydride thus forming predominantly polyamide-polyamine trimers;

(e) optionally further mixing the mixture resulting from step (d), for at least 1 hour, at room temperature;

(f) heating the mixture resulting from (d) or from (e) to a temperature of between 60° C. to 100° C., for at least 2 hrs, thus allowing the formation of the dendripolyamide X; and (g) optionally isolating the dendripolyamide X resulting from step (f).

43. A process for the preparation of dendripolyamide CD comprising the steps of:

(a) dissolving a mole of 1,4-diaminocyclohexane in ethyl alcohol and 4 moles of 3,3',5,5'-tetrabromobisphenol A diglycidyl ether in butyl acetate and mixing the same;

(b) optionally further mixing the solution resulting from (a) for at least 30 min, at room temperature;

(c) heating the mixture resulting from step (a) or from step (b) to a temperature of from 50° C. to 80° C., for at least 1 hour, thus allowing the formation of a 4-functional polyepoxy adduct;

(d) mixing about 4 moles of a polyamine-polyamide oligomer, dissolved in ethyl alcohol, with a mole of the 4-functional polyepoxy adduct resulting from (c), which polyamine-polyamide oligomer is obtained by oligomerizing polyamino-polyamide oligomer with 5-norborone 2,3-dicarboxylic anhydride to obtain predominantly trimers;

(e) optionally further mixing the mixture resulting from (d), for at least 1 hour, at room temperature;

(f) heating the mixture resulting from (d) or in (e) to a temperature of between 60° C. to 100° C., for at least 2 hrs, thus allowing the formation of the dendripolyamide CD;

(g) optionally isolating.

44. A process for the preparation of dendripolyamide PGA comprising the steps of:

(a) dissolving a mole of poly(propylene glycol)bis(2-aminopropyl)ether and 4 moles of diglycidyl 2,4,6-tribromoaniline in butyl acetate and mixing the same;

(b) optionally further mixing the solution resulting from (a) for at least 30 min, at room temperature;

(c) heating the mixture resulting from (a) or from (b) to a temperature of from 50° C. to 80° C., for at least 1 hour, thus allowing the formation of a 4-functional polyepoxy adduct;

(d) mixing about 4 moles of a polyamine-polyamide oligomer, dissolved in ethyl alcohol, with a mole of the 4-functional polyepoxy adduct resulting from (c), which polyamine-polyamide oligomer is optionally prepared by the step comprising:

(i) preparing fatty acid monomers by methanolysis of bean oil;

(ii) oligomerizing the monomers resulting from (i) in the presence of sebacic acid and activated aluminum oxide, thus obtaining predominantly dimers thereof, (iii) polycondensing the oligomer resulting from step (ii) with from a bout 5% to about 20% excess of triethylenetetramine to give a polyamide-polyamine oligomer;

(iv) further reacting the polyamide-polyamine oligomer resulting from (iii) with bis(4-oxyphenyl)sulphone diglycidy ether dissolved in 2-propanol;

(e) optionally further mixing the mixture resulting from (d), for at least 1 hour, at room temperature;

(f) heating the mixture resulting from (d) or from (e) to a temperature of between 60° C. to 100° C., for at least 2 hrs, thus allowing the formation of the dendripolyamide PGA; and (g) optionally isolating the dendripolyamide PGA resulting from step (f).

45. A process for the preparation of dendripolyamide IDA comprising the steps of:

(a) dissolving a mole of a diamide obtained by reacting isophoronediamine and a fatty acid dimer, and 4 moles of diglycidyl aniline in 2-propanol and mixing the same;

(b) optionally further mixing the solution resulting from (a) for at least 30 min, at room temperature;

(c) heating the mixture resulting from (a) or from (b) to a temperature of from 50° C. to 80° C., for at least 1 hour, thus allowing the formation of a 4-functional polyepoxy adduct;

(d) mixing about 4 moles of a polyamine-polyamide oligomer, dissolved in 1-methyl-2-pyrrolidinone, with a mole of the 4-functional polyepoxy adduct resulting from (c), which polyamine-polyamide oligomer is optionally prepared by the steps comprising:

(i) preparing fatty acid monomers by methanolysis of sunflower oil;

(ii) oligomerizing the monomers resulting from (i) in the presence of terephthalic acid and activated aluminum oxide, thus obtaining predominantly dimers thereof, (iii) polycondensing the oligomer resulting from step (ii) with from about 5% to about 20% excess of triethylenetetramine to give a polyamide-polyamine oligomer;

(iv) further reacting the polyamide-polyamine oligomer resulting from step (iii) with 1,6-hexandiol diglycidyl ether dissolved in 1-methyl-2-pyrrolidinone;

(e) optionally further mixing the mixture resulting from (d), for at least 1 hour, at room temperature;

(f) heating the mixture resulting from (d) or from (e) to a temperature of between 60° C. to 100° C., for at least 2 hrs, thus allowing the formation of the dendripolyamide IDA;

(g) optionally isolating the dendripolyamide IDA resulting from step (f).

46. A process for the preparation of dendripolyamide ABA comprising the steps of:

(a) dissolving a mole of 4-aminobenzylamine with 4 moles of 1,1-dimethyl-2,4-diglycidyl hydantoin in ethanol and mixing the same;

(b) optionally further mixing the solution resulting from (a) for at least 30 min, at room temperature;

(c) heating the mixture resulting from (a) or from (b) to a temperature of from 50° C. to 80° C., for at least 1 hour, thus allowing the formation of a 4-functional polyepoxy adduct;

(d) mixing about 4 moles of polyamine-polyamide oligomer dissolved in butyl alcohol, with a mole of the 4-functional polyepoxy adduct obtained in (c), which polyamine-polyamide oligomer was obtained by reacting HY825 polyamide with a diglycidyl ether of cc-hexafluoro-bisphenol A, dissolved in ethanol;

(e) optionally further mixing the mixture resulting from (d), for at least 1 hour, at room temperature;

(f) heating the mixture resulting from (d) or from (e) to a temperature of between 60° C. to 100° C., for at least 2 hrs, thus allowing the formation of the dendripolyamide ABA; and (g) optionally isolating the dendripolyamide ABA resulting from step (f).

* * * * *

UNITED STATES PATENT AND TRADEMARK OFFICE
CERTIFICATE OF CORRECTION

PATENT NO.  : 6,288,208 B1  
DATED       : September 11, 2001  
INVENTOR(S) : Leonid Moshinsky Page 1 of 1

It is certified that error appears in the above-identified patent and that said Letters Patent is hereby corrected as shown below:

<u>Column 68,</u>  
Line 23, delete "1 00°" and insert -- 100° --.

<u>Column 72,</u>  
Line 34, delete "a bout" and insert -- about --.

Signed and Sealed this

Twelfth Day of March, 2002

Attest:

Attesting Officer

JAMES E. ROGAN  
*Director of the United States Patent and Trademark Office*